United States Patent
Rampen et al.

(10) Patent No.: US 11,137,330 B2
(45) Date of Patent: Oct. 5, 2021

(54) DISPLACEMENT OF AN OBJECT WITH HYDRAULIC ACTUATORS

(71) Applicant: ARTEMIS INTELLIGENT POWER LIMITED, Loanhead (GB)

(72) Inventors: William Hugh Salvin Rampen, Loanhead (GB); Niall Caldwell, Loanhead (GB); Peter Mccurry, Loanhead (GB)

(73) Assignee: ARTEMIS INTELLIGENT POWER LIMITED, Midlothian (GB)

( * ) Notice: Subject to any disclaimer, the term of this patent is extended or adjusted under 35 U.S.C. 154(b) by 222 days.

(21) Appl. No.: 16/253,730

(22) Filed: Jan. 22, 2019

(65) Prior Publication Data

US 2019/0226959 A1    Jul. 25, 2019

(30) Foreign Application Priority Data

Jan. 19, 2018    (EP) ..................... 18275009

(51) Int. Cl.
*G01N 3/36* (2006.01)
*F15B 15/18* (2006.01)
(Continued)

(52) U.S. Cl.
CPC ............. *G01N 3/36* (2013.01); *F03C 1/045* (2013.01); *F03C 1/047* (2013.01); *F03C 1/0435* (2013.01);
(Continued)

(58) Field of Classification Search
CPC ............ G01N 3/36; G01N 2203/0016; G01N 2203/0048; G01M 5/005; F03C 1/045;
(Continued)

(56) References Cited

U.S. PATENT DOCUMENTS 5,092,824 A * 3/1992 Connett ................ F04D 13/028
                                                                    417/212
6,666,022 B1 * 12/2003 Yoshimatsu .............. B60L 1/00
                                                                     60/413
(Continued)

FOREIGN PATENT DOCUMENTS

CN     102661236 A    9/2012
DE  102014116770 B3    4/2016
(Continued)

OTHER PUBLICATIONS

Greaves, Peter,Robert, "Fatigue Analysis and Testing of Wind Turbine Blades," Durham theses, Durham University, 2013.
(Continued)

*Primary Examiner* — Octavia Hollington
(74) *Attorney, Agent, or Firm* — Hauptman Ham, LLP

(57) ABSTRACT

An object is displaced alternately in opposite directions, using a hydraulic power unit having a rotatable body which includes the shaft of a hydraulic machine having electronically commutated valves. A motor drives the rotatable body. The hydraulic machine drives an actuator to displace the object in use. Energy is transformed from rotational kinetic energy of the rotatable body to elastic strain energy or elastic strain and gravitational potential energy of the object during a pumping phase and rotation of the rotatable body slows, but does not change direction. The potential energy then drives the hydraulic machine to motor and the rotatable shaft speeds up again, storing rotational kinetic energy. The displacement of the hydraulic machine is controlled throughout to match a time varying demand taking into account the varying speed of rotation of the rotatable shaft. The motor provides energy to compensate for losses and the process can repeat cyclically.

20 Claims, 16 Drawing Sheets

(51) Int. Cl.
*G01M 5/00* (2006.01)
*F03C 1/34* (2006.01)
*F03C 1/053* (2006.01)
*F04B 49/22* (2006.01)
*F04B 7/00* (2006.01)
*F03C 1/40* (2006.01)
*F03C 1/047* (2006.01)

(52) U.S. Cl.
CPC ............ *F03C 1/053* (2013.01); *F04B 7/0076* (2013.01); *F04B 49/22* (2013.01); *F15B 15/18* (2013.01); *G01M 5/005* (2013.01); *F05B 2260/83* (2013.01); *F15B 2211/20515* (2013.01); *F15B 2211/20561* (2013.01); *F15B 2211/27* (2013.01); *G01N 2203/0016* (2013.01); *G01N 2203/0048* (2013.01)

(58) Field of Classification Search
CPC ........ F03C 1/047; F03C 1/053; F03C 1/0435; F04B 7/0076; F04B 49/22; F05B 2260/83; F15B 15/18; F15B 2211/20515; F15B 2211/20561; F15B 2211/27
USPC .......................................................... 73/788
See application file for complete search history.

(56) References Cited

U.S. PATENT DOCUMENTS

| | | | | |
|---|---|---|---|---|
| 6,681,571 | B2* | 1/2004 | Bailey | F04B 49/03 |
| | | | | 60/429 |
| 8,944,788 | B2* | 2/2015 | Armstrong | F04C 2/103 |
| | | | | 418/1 |
| 9,352,743 | B2* | 5/2016 | Davis | F15B 21/14 |
| 9,488,163 | B2* | 11/2016 | Caldwell | F04B 1/00 |
| 2011/0123354 | A1* | 5/2011 | Stein | F04B 53/1082 |
| | | | | 417/53 |
| 2012/0059523 | A1* | 3/2012 | Salter | F03B 15/02 |
| | | | | 700/281 |

FOREIGN PATENT DOCUMENTS

| | | |
|---|---|---|
| EP | 2896830 A1 | 7/2015 |
| JP | 61013133 A | 1/1986 |
| WO | 2014054072 A1 | 4/2014 |

OTHER PUBLICATIONS

European Search Report from corresponding European Application No. EP 18 27 5009, Jul. 16, 2018, pp. 1-10, European Patent Office, Munich, Germany.

* cited by examiner

DISPLACEMENT OF AN OBJECT WITH HYDRAULIC ACTUATORS

FIELD OF THE INVENTION

The invention relates to the field of displacing an object with one or more hydraulic actuators, where the displacement of the object is then reversed, driven at least in part by the return of stored elastic, or elastic and gravitational potential energy, and the direction of displacement is reversed repeatedly.

Some embodiments of the invention relate to the field of displacing an object in order to elastically deform it, the object then returning, and the direction of displacement is reversed a multiplicity of times to thereby stress test the object, and investigate its fatigue properties.

BACKGROUND TO THE INVENTION

It is known from U.S. Pat. No. 3,937,058 (Hilbrands) to repetitively stress objects, such as wind turbine blades, or vehicle suspensions, using hydraulic actuators with a view to carrying out stress tests. However, these tests typically consume a substantial amount of power, which is dissipated as heat, due to the considerable forces which are required to deform such objects on each repetition and the many repetitions required to conduct a stress test.

It is known from U.S. Pat. No. 8,621,934 (Hughes et al.) to test objects at a resonant frequency of the object, which allows relatively large oscillations to be built up over a period of time by the application of a repetitive strain in phase with the oscillations. However, it is often desirable to test objects at frequencies which are not resonant frequencies. For example, a suitable test frequency for a stress test of a wind turbine blade is likely to be much lower than any resonant frequency of the blade.

DE 102014116770 (Hoffman and Brettner) discloses a power generation mode in which a hydraulic actuator is driven by an electric motor to deform a resilient member which then deforms back through elastic recovery and drives the electric motor as a generator. This allows energy to be recovered to some extent, but there is little control of the deformation of the resilient member, the electric motor is required to be sufficiently powerful to generate a substantial torque and so will consume a substantial amount of power, and the process of generating, storing and reusing electrical energy includes significant losses.

JP S6113133 (Muranaka and Hosoya) discloses a hydraulic compression testing device where during part of a test cycle, the compression reaction of the test piece becomes the driving source of the hydraulic pressure, enabling significant energy reuse. However, again there is little control over the displacement of the test piece.

Accordingly, the invention seeks to provide energy efficient apparatus and methods for stress testing, and other applications in which objects are displaced, and the direction of displacement is repetitively reversed.

A further problem with known test apparatus is that there is a lack of control of the time variation of the force acting on and the displacement of an object within a cycle of displacement, and (where applicable) a lack of control of the relative displacement of different locations on an object (e.g. different locations along the length of a wind turbine blade or different parts of the chassis of a vehicle). For example, with a typical hydraulic actuator, hydraulic fluid is pumped at a continuous rate into the actuator for a defined period of time. A variation of the period of time or the pump flow rate allows control as to how far an object is deformed (against gravity and/or elastic forces, for example) but does not allow fine control of the variation in deformation and the force exerted on the object with time throughout a deformation cycle. Accordingly, some embodiments of the invention aim to provide improved control of the time variation of the force action on and/or the displacement of an object.

SUMMARY OF THE INVENTION

According to a first aspect of the invention there is provided apparatus for repetitively displacing an object, the apparatus comprising:
   an object engagement element,
   a hydraulic actuator connected to the object engagement element,
   a hydraulic machine having a low pressure manifold and a high pressure manifold, the high pressure manifold coupled to the hydraulic actuator, a rotatable body comprising a rotatable shaft, a plurality of working chambers having a volume which varies cyclically with rotation of the rotatable shaft, a plurality of valves regulating the flow of working fluid between the respective working chambers and the low and high pressure manifold, at least one valve per working chamber being an electronically controlled valve,
   a controller which electronically controls the said valves to thereby regulate the net displacement of working fluid by each working chamber during each cycle of working chamber volume, including selecting between pumping cycles in which a working chamber makes a net displacement of working fluid from the low pressure manifold to the high pressure manifold and motoring cycles in which a working chamber makes a net displacement of working fluid from the high pressure manifold to the low pressure manifold,
   a motor drivingly coupled to the rotatable body and configured to exert a torque on the rotatable body (to thereby increase the rotational kinetic energy of the rotatable body),
   wherein the controller is configured (e.g. programmed) to alternately control the said valves to thereby regulate the pumping of working fluid to the hydraulic actuator to thereby displace an object which engages the object engagement element in use and then to control the said valves to thereby regulate the motoring of working fluid from the hydraulic actuator as a result of forces from the object bearing on the object engagement element,
   the speed of rotation of the rotatable body (and therefore the rotatable shaft) varies and the control of the said valves by the controller takes into account the speed of rotation of the rotatable body (and therefore the rotatable shaft).

In a second aspect, the invention extends to a method of repetitively displacing an object, the method comprising
   providing a hydraulic apparatus, the hydraulic apparatus comprising:
   a hydraulic actuator coupled to the object through an object engagement element,
   a hydraulic machine having a low pressure manifold and a high pressure manifold, the high pressure manifold coupled to the hydraulic actuator, a rotatable body comprising a rotatable shaft, a plurality of working chambers having a volume which varies cyclically with rotation of the rotatable shaft, a plurality of valves regulating the flow of working fluid between the respective working chambers and the low and high pressure manifold, at least one valve per working chamber being an electronically controlled valve, a motor drivingly coupled to the rotatable body, the method comprising:

operating the motor to exert a torque on the rotatable body to thereby increase the rotational kinetic energy of the rotatable body, the speed of rotation of the rotatable body (and therefore the rotatable shaft) varying during operation, controlling the said valves to thereby regulate the net displacement of working fluid by each working chamber during each cycle of working chamber volume, such that the working chambers alternatively carry out pumping and motoring, wherein during pumping the said valves are controlled to cause the working chambers to carry out pumping cycles in which a working chamber makes a net displacement of working fluid from the low pressure manifold to the high pressure manifold, and during motoring, and wherein during motoring the said valves are controlled to cause the working chambers to carry out motoring cycles in which a working chamber makes a net displacement of working fluid from the high pressure manifold to the low pressure manifold, and wherein the control of the said valves takes into account the varying speed of rotation of the rotatable body (and therefore the rotatable shaft).

Accordingly, energy used to displace the object during pumping is supplied in part by the motor and in part by the rotational kinetic energy of the rotatable body. Through displacement much of the energy is transformed to potential energy (e.g. elastic potential energy, or elastic and gravitational potential energy). The majority of the energy used to displace the object is then returned during motoring and stored as rotational kinetic energy of the rotatable body for reuse on a subsequent displacement. Thus, this apparatus and method can be highly energy efficient. The motor can consume less power than would otherwise be required. The motor is typically an electric motor, although one skilled in the art will be aware of other motor types that may be adopted. It will be understood that by motoring of working fluid as a result of forces from the object bearing on the object engagement element, we refer to the valves being controlled to cause the respective working chambers to carry out motoring cycles in which there is a net displacement of working fluid from the high pressure manifold to the low pressure manifold, so that forces from the object (which pressurise the fluid in the high pressure manifold) supply energy which is converted to rotational kinetic energy of the rotatable body.

Furthermore, because the control of the said valves takes into account the varying speed of rotation of the rotatable body (and therefore the rotatable shaft which is part of the rotatable body), the force exerted on and/or the displacement of the object can be varied over time in an accurately controlled manner despite the variation in speed of rotation of the rotatable body and the concomitant variation in frequency of cycles of working chamber volume (which would otherwise lead to reduced control of the rate of displacement per unit time of the hydraulic machine). A substantial change in the speed of rotation of the rotatable body can therefore be allowed, enabling a substantial amount of energy to be returned and stored in rotational kinetic energy.

The rotatable body is a rotatable (in use rotating) mass comprising the rotating shaft and typically comprising the rotating elements of the electric motor (e.g. a rotor), the rotating elements of the hydraulic machine, and optionally associated couplings. The dominant inertia of the rotatable body may be the inertia of the rotating elements of the electric motor. The rotatable body may comprise a flywheel. The dominant inertia of the rotatable body may by that of the flywheel.

The rotatable body comprises the rotatable shaft and so the speed of rotation of the rotatable body and the rotatable shaft are interchangeable. That being said, different parts of the rotatable body (e.g. flywheel and shaft) could in principle rotate at different speeds using gears, in which case the speed of rotation of the different parts would be in a gearing ratio.

It may be that the rotational kinetic energy of the rotatable body is used at least in part (typically as the predominant energy source) to drive the pumping of working fluid to the hydraulic actuator and the speed of rotation of the rotatable body falls as a result. Typically, the output of working fluid from the hydraulic actuator (as a result of forces from the object) is used to motor the hydraulic machine to accelerate the rotatable body. Thus, forces from the object are used to accelerate the rotation of the rotatable body and so potential energy from the object is transformed to stored rotational kinetic energy in the rotatable body.

It may be that, in use, the majority of the energy used to displace (and internally stress and strain) the object is supplied by the rotational kinetic energy of the rotatable body. Thus energy is stored in the object due to its displaced, internally stressed state. Subsequently, the majority of the said energy stored in the object is recovered and stored as rotational kinetic energy of the rotatable body.

It may be that the said pumping of working fluid to the hydraulic actuator and the said motoring of the hydraulic machine using working fluid from the hydraulic actuator takes place cyclically. Accordingly, when performing a repetitive test (such as a repetitive stress test), energy is transformed cyclically from rotational kinetic energy of the rotatable body to elastic strain energy, or elastic strain and gravitational potential energy of the object and back again. The (typically electric) motor may provide energy to compensate for losses in this cyclic transformation.

It may be that the torque exerted by the (e.g. electric) motor on the rotatable body acts (and typically is controlled) to maintain the peak rotational kinetic energy of the rotatable body from one cycle to the next by providing sufficient energy during each cycle to compensate for losses. This has the effect that the (e.g. electric) motor may have a lower maximum torque and/or maximum continuous rated torque than would be required if the motor had to be able to generate all of the torque required to displace the object engagement element (and so the object, in use).

Typically, the frequency of the cycles (of alternate pumping and motoring) is not a resonant frequency of the object.

It may be that the motor is an electrical motor having an electronic variable speed drive which allows at least a 10% (or at least a 20% or at least a 30%) change in the speed of rotation of the rotatable body (to which it is coupled) during operation (e.g. from one said pumping of working fluid to an immediately following said motoring of working fluid to an immediately following said pumping of working fluid), optionally while continuously applying torque.

It may be that a target rotation speed of the rotatable body is determined, the electric motor (and optionally the hydraulic machine) is regulated towards the target rotation speed, the electric motor is a variable speed motor driven by a variable speed drive configured to allow the speed to vary within a range, the hydraulic machine alternately decelerating the rotatable body (typically acting in opposition to the motor) during said pumping cycles and accelerating the rotatable body (typically acting in the same direction as the motor) during said motoring cycles, thus leading to an oscillation in speed of rotation of the rotatable body between said pumping and said motoring, wherein a torque trim is applied (typically by the variable speed drive driving the motor) in order to make up for losses in the apparatus and provide a controlled oscillation of the object.

It may be that the hydraulic machine is controlled to avoid overspeed or underspeed of the rotation of the rotatable body. For example the net displacement of hydraulic fluid into or out of the HP manifold may be restricted or increased respectively responsive to an overspeed or underspeed criterion being met.

It may be that the rate of displacement per unit time of working fluid during pumping is controlled (typically by the controller controlling the valves), such that one or more of the group consisting of:
(i) the displacement of the object engagement element (or the object) along a path; and
(ii) the force exerted by the object engagement element on an object; and
(iii) the pressure in the high pressure manifold;
is regulated to follow a time-varying demand.

It may be that the rate of displacement per unit time of working fluid during motoring is controlled (typically by the controller controlling the valves) such that one or more of the group consisting of:
(i) the displacement of the object engagement element (or the object) along a path; and
(ii) the force exerted by the object engagement element on an object; and
(iii) the pressure in the high pressure manifold; is regulated to follow a time-varying demand.

The time-varying demand may be predetermined. The time-varying demand may be calculated taking into account one or more control signals, which may be input control signals, e.g. from a user.

Thus the demand might for example be data (e.g. a demand signal) indicative of a displacement, force or pressure. In some embodiments, where the pressure in the high pressure manifold determines the force acting on the object, the force and pressure are interrelated and typically they are a function of each other.

It may be that the (e.g. predetermined) time-varying demand is non-linear. In some embodiments, the predetermined time-varying demand is the same through a plurality, and typically 100 or more, consecutive cycles.

The method may comprise the step of determining a said time-varying demand throughout a cycle of displacement by one or more of:
(i) simulating and or/monitoring the force exerted by the object on the object engagement element during a cycle of displacement,
(ii) simulating and/or monitoring the movement of the object during a cycle of displacement,
(iii) simulating and/or monitoring the loss of energy during a cycle of displacement, and/or
(iv) detecting the violation of thresholds (e.g. limits) as to displacement, speed of movement or force exerted during a cycle of displacement.

Thus the time-varying demand may be determined using simulation, or empirically. The time-varying demand may be iteratively conditioned (e.g. optimised). This enables a desired cyclic pattern of displacement to be implemented despite the potentially complex interaction between the hydraulic actuator(s) and the object.

The speed of rotation or power consumption of the motor may be taken into account and/or varied during said determination.

It may be that the rate of displacement of working fluid per rotation of the rotatable body is controlled during pumping (typically by the controller controlling the valves) to thereby regulate the rate of displacement of working fluid per unit time taking into account the varying speed of rotation of the rotatable body.

It may be that the rate of displacement of working fluid per rotation of the rotatable body is controlled during motoring (typically by the controller controlling the valves) to thereby regulate the rate of displacement of working fluid per unit time taking into account the varying speed of rotation of the rotatable body.

Thus, the rate of displacement of working fluid per rotation of the rotatable body and the rate of displacement of working fluid per unit time may be independently varied. The valves may be controlled to regulate the net rate of displacement of working fluid per unit time of the plurality of working chambers, said net rate of displacement per unit time being selectable independently of the speed of rotation of the rotatable body.

This enables the time-varying profile of the force and/or displacement to be accurately controlled. This assists in providing a controlled displacement of an object during pumping (including motion of an object which is driven by independently controlled hydraulic machines, and including controlled flexion of an object, particularly when the object is simultaneously engaged (and typically also clamped) at a plurality of locations driven by independently controlled hydraulic machines). It also enables energy to be efficiently recovered from the object during motoring. Still further, it enables the speed of rotation of the rotatable body to vary substantially, without loss of control of the force acting on the object or loss of control of displacement of the object, enabling a substantial proportion of the energy transferred to the object and stored as potential energy (e.g. stored as gravitational potential energy, or elastic potential energy (as the stressed distorted shape of the displaced object) to be converted (back) to rotational kinetic energy of the rotatable body, thereby improving energy efficiency. As a result, the time varying profile of the force exerted on and the displacement of the object can be carefully controlled, and customised to a particular application, while the machine remains energy efficient.

The rate of displacement of working fluid per rotation of the rotatable body may be controlled (typically by the controller) by controlling the fraction of working chambers which do, or which do not, make a net displacement of working fluid. Cycles of working chamber volume in which there is no net displacement of working fluid may be interspersed between pumping cycles and/or interspersed between motoring cycles. The rate of displacement of working fluid per rotation of the rotatable body may be controlled by controlling the fraction of working chamber volume which is displaced during each pumping or motoring cycle.

The net rate of displacement of working fluid per unit time is proportional to the product of the mean rate of displacement of working fluid per rotation of the rotatable body and the speed of rotation of the rotatable body.

Thus, when the speed of rotation of the rotatable body increases, the average net displacement of working fluid per working chamber is reduced for a given demanded net rate of displacement of working fluid per unit time (due to the increased frequency of cycles of working chamber volume), and vice versa when the speed of rotation of the rotatable body increases. This enables the machine to work efficiently while tolerating significant variations in the speed of rotation of the rotatable body.

The motor may be an electric motor. The electric motor may be a variable speed electric motor. For example, it may be that the motor has a variable speed drive, for example a frequency converter.

A regulator may regulate the electric motor (e.g. the speed of rotation, or torque, or power output of the motor), for example by regulating the speed or frequency of the said variable speed drive, responsive to the speed of rotation of the rotatable body, e.g. to maintain the speed of rotation of the rotatable body within a range, or below a maximum (e.g. a maximum peak during each cycle) or above a minimum (e.g. a minimum during each cycle) or to a target speed, with a tolerance. It may be that the regulator regulates the motor more strongly if the speed of rotation of the rotatable body departs further from a demand (e.g. at the centre of range 312 in FIG. 16) or from a demand range (within or equal to 312).

An object may be to work the system as hard as possible, within the capability limits of the electric motor, where said limits may change over time. The pumping step and the motoring step may be regulated to ensure the highest cycle frequency is achieved within given system limits. A pumping-motoring cycle consists of the hydraulic machine pumping fluid into a ram in order to apply force on the object, to cause deflection, followed by a motoring step where the pressurised fluid in the ram is used to motor the hydraulic machine, where the complete pump to motor pattern constitutes a cycle, said cycle having a cycle frequency. Achievable hydraulic pumping motoring cycles are limited once system losses for a given cycle approach the maximum power input from the electric motor. This regulation may act to reduce the hydraulic pumping motoring cycle frequency if the average power of the electric motor approaches its achievable power limit, or if the average speed reduces below a set point. Regulation may consist of:
- limiting the maximum displacement exerted during a cycle
- limiting the maximum velocity that an actuator (e.g. ram) exerts
- changing the shape (e.g. variation in amplitude with phase) of the cycle
- reducing the maximum velocity of the actuator during some parts of the cycle
- changing the amplitude of the cycle
- changing the frequency of the cycle Regulation of the speed of the electric motor by the variable speed drive may take place within some or all of three regions of operation. It may be that above a threshold ('speed max') where the electric motor does not provide torque to avoid a further increase in speed of rotation. It may be that below a threshold ('speed min') the electric motor is commanded to provide maximum torque to avoid stalling. It may be that within an predetermined range (with the speed between 'speed max' and 'speed min') the variable speed drive acts in conjunction with the hydraulic pumping motoring cycle controller (frequently the dominating torque input). The variable speed drive controlling the electric motor typically seeks to maintain a target speed (albeit typically with loose regulation of speed around the target). Thus as the hydraulic machine starts to pump, the speed of the rotating body slows as the hydraulic machine extracts energy from the rotating body, and is allowed to slow according to the (loose) speed regulation. The hydraulic machine uses the kinetic energy arising from rotation of the rotating body, to pressurise/raise pressure in the cylinders. This regulation may allow the speed of rotation to vary to convert potential energy in the actuator to kinetic energy in the rotating body and vice versa thus reducing peak power consumption of this system (as energy stored in rotational kinetic energy during the motoring phase is later used to pump). The speed variation permits energy storage in the hydraulic system.

It may be (e.g. as an alternative to regulating the motor more strongly), if the speed of rotatable body drops below a threshold, that the reversing of the direction of displacement (e.g. cycles of displacement) may take place at a reduced frequency (e.g. cycles of displacement may be slowed down).

Typically, the electric motor is operated continuously in use (e.g. during repetitive cycles of the transformation of rotational kinetic energy of the rotatable body to the elastic strain energy and/or gravitational potential energy of the body and back again). This makes efficient use of the (typically electric) motor, for example avoiding time required to start or restart a motor from zero or very low speed, and minimising acceleration and deceleration of the motor which are typically regions of lower motor efficiency (especially for electric motors). The (typically electric) motor may be operated discontinuously, for example during periods of load holding. Conventional systems or apparatus for displacing an object suffer from leakage of working fluid, the leakage coming primarily from a proportional valve feeding the actuator ram. Additionally the hydraulic machines of known apparatus are typically variable displacement swash plate pumps/motors, which will themselves be a source of leakage. If the demand (target) is a set holding force or pressure acting for a long period of time (e.g. long hours of hydraulic pressure required in composite pressing), during that period of constant pressure, no work is performed. Although no work is performed, in a conventional system in the art, it suffers substantial leakage, requiring input of fluid power, whereas the present invention hydraulic machine can be implemented using face sealing poppet valves (as the said electronically controlled valves). These typically have zero backflow, allowing holding the pressure with either little or infrequent operation of the (electric) motor.

It may be that the power transmitted to the rotatable body temporarily exceeds the maximum and/or rated output torque of the (e.g. electric) motor (using the rotational kinetic energy of the rotatable body). It may be that the (e.g. electric) motor is driven at above its maximum continuous rated torque for a limited period of time.

The valves and/or the motor may be controlled such that the rotatable body turns in a single direction, with time-varying oscillating speed of rotation.

The valves and/or the motor may be controlled, to override the normal cylinder enabling sequence, in such a way that the speed of rotation of the rotatable body does not fall breach a minimum or maximum threshold.

This is advantageous because if the rotatable body has zero speed of rotation, at that point the input power limit is zero (as power cannot be put into a stationary shaft). If the objective is to provide the possibility to add power from the prime mover, the apparatus loses that ability if the shaft stops. In the event of wishing to add power from the prime mover, shaft stop could lead to a stall condition, because input power is required to accelerate the shaft.

It may be that the speed of rotation of the rotatable body varies by more than 10% (more than 20%). Thus, the rotational kinetic energy stored in the rotatable body may vary by at least 21%, or in some embodiments at least 44%. This makes significant use of the rotatable body as a store of energy, which can displace the object again.

The apparatus may be stress testing apparatus and the object may be an object under test. The object may, for example, be an elongate member, such as a blade (e.g. turbine blade, for example a wind turbine blade) or a chassis (e.g. of an aeroplane or wheeled vehicle).

Typically the controller controls the valves in phased relationship to cycles of working chamber volume. The hydraulic machine typically comprises a position or speed sensor for determining the phase of cycles of working chamber volume.

Typically the controller regulates the valves to select between active cycles in which a respective working chamber makes a net displacement of working fluid and inactive cycles in which a respective working chamber makes no net displacement of working fluid. Typically, active and inactive cycles are interspersed to thereby regulate the net displacement of working fluid per rotation of the rotatable body.

The controller typically comprises one or more hardware processors executing stored program code. The controller may be distributed, for example amongst a plurality of hardware processors and/or circuits.

The rotatable body may comprise a flywheel. However, in some embodiments, the rotatable body (and/or the rotor of the electric motor) has sufficient rotational inertia that no additional flywheel is required.

Typically, the speed of rotation of the rotatable body decreases from the beginning to the end of a period of pumping, and then increases between the beginning and the end of a period of motoring.

It may be that in a repetitive test, a cycle of displacement of the rotatable body with concomitant deceleration and then acceleration of the rotatable body is repeated continuously for at least 100 cycles.

It may be that the hydraulic machine further comprises a further high pressure manifold, the first high pressure manifold coupled to a further hydraulic actuator connected to a further object engagement element (attachable to or attached to a different part of the object in use), and a further plurality of working chambers having a volume which varies cyclically with rotation of the rotatable body and a further plurality of valves regulating the flow of working fluid between the respective further working chambers and the same or a further low pressure manifold and the further high pressure manifold, at least one said further valve per working chamber being an electronically controlled valve, wherein the controller electronically controls the said further valves to thereby regulate the net displacement of working fluid by each further working chamber during each cycle of working chamber volume, including selecting between pumping cycles in which a working chamber makes a net displacement of working fluid from the low pressure manifold to the high pressure manifold and motoring cycles in which a working chamber makes a net displacement of working fluid from the high pressure manifold to the low pressure manifold, wherein the controller is configured (e.g. programmed) to alternately control the said further valves to thereby regulate the pumping of working fluid to the further hydraulic actuator to thereby displace the object, where it engages the further object engagement element in use and then to control the said further valves to thereby regulate the motoring of working fluid from the further hydraulic actuator as a result of forces from the object bearing on the further object engagement element, wherein control of the said further valves by the controller takes into account the speed of rotation of the rotatable body.

Cycles of volume of the further working chambers are coupled to rotation of the rotatable body. Typically, the rotatable shaft is common to both the working chambers and the further working chambers.

The invention extends in a third aspect to a system for repetitively displacing an object comprising a plurality of apparatus according to the first aspect of the invention, with the object engaging elements of the respective apparatus being attachable to (optionally attached to) different parts of an object and a system controller operable to regulate in concert the pumping and motoring of the respective apparatus to thus control the movement of the object engaging elements in concert.

In a fourth aspect the invention extends to a method of repetitively displacing an object, the method comprising providing a plurality of said hydraulic apparatus coupled to different parts of the object, each hydraulic apparatus being according to the first aspect of the invention and/or controlled according to the second aspect of the invention, and controlling the pumping and motoring by the respective hydraulic apparatus to thereby cause the object to be displaced (e.g. flexed) according to a time-varying profile. The time-varying profile might be predetermined. The time-varying profile might be cyclic.

The hydraulic apparatus is typically embodied as a hydraulic power unit (HPU) which may supply and/or receive pressurised hydraulic fluid.

Optional and preferred features described above relate to each aspect of the invention.

DESCRIPTION OF THE DRAWINGS

An example embodiment of the present invention will now be illustrated with reference to the following Figures in which:

FIGS. 13A & 13B illustrate a first strategy and FIGS. 13C & 13D a second strategy for avoiding speed of rotation dropping below a minimum. The horizontal-axis is time. In FIGS. 13A and 13C, the vertical-axis is power and in FIGS. 13B and 13D the vertical-axis is speed of rotation of the rotatable body;

DETAILED DESCRIPTION OF AN EXAMPLE EMBODIMENT

Figure 1:
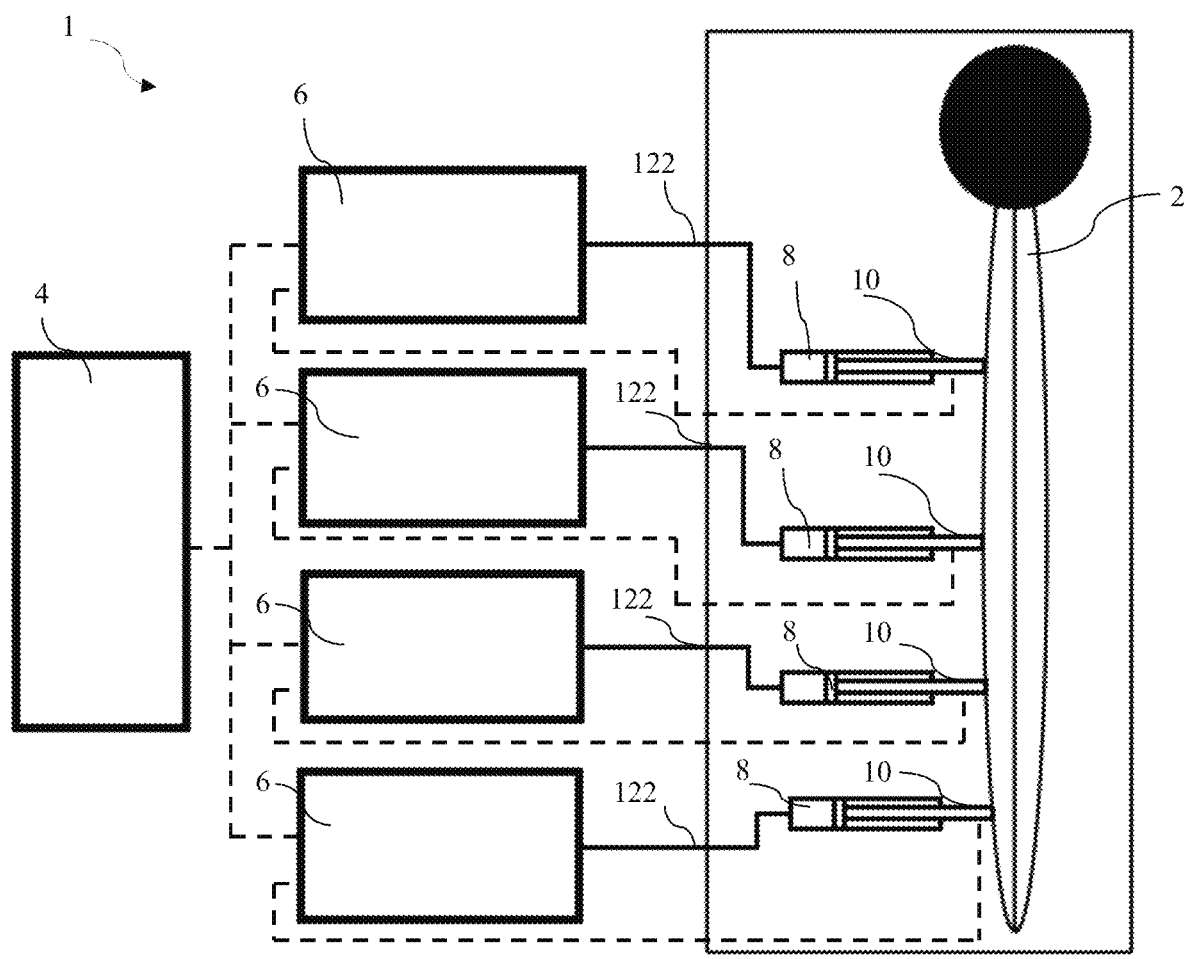
FIG. 1 is a schematic diagram of a system for the stress testing of a turbine blade.

FIG. 1 is a schematic diagram of a system 1 for the stress testing of a turbine blade 2, being an example application of the present invention. A system controller 4 controls four different hydraulic power units 6 which drive respective hydraulic actuators (rams) 8 that bear on the wind turbine blade at different locations along its length through object engagement elements 10 which may be fitments shaped to conform to the turbine blade or may simply be the ends of the actuators. The hydraulic power units are driven by an electrical power supply. Pressure sensors (not shown) monitor the pressure of the hydraulic fluid supplied to each actuator by the respective power unit and position sensors monitor the deflection of each actuator (e.g. distance travelled, or orientation in the case of a rotary actuator).

Figure 2:
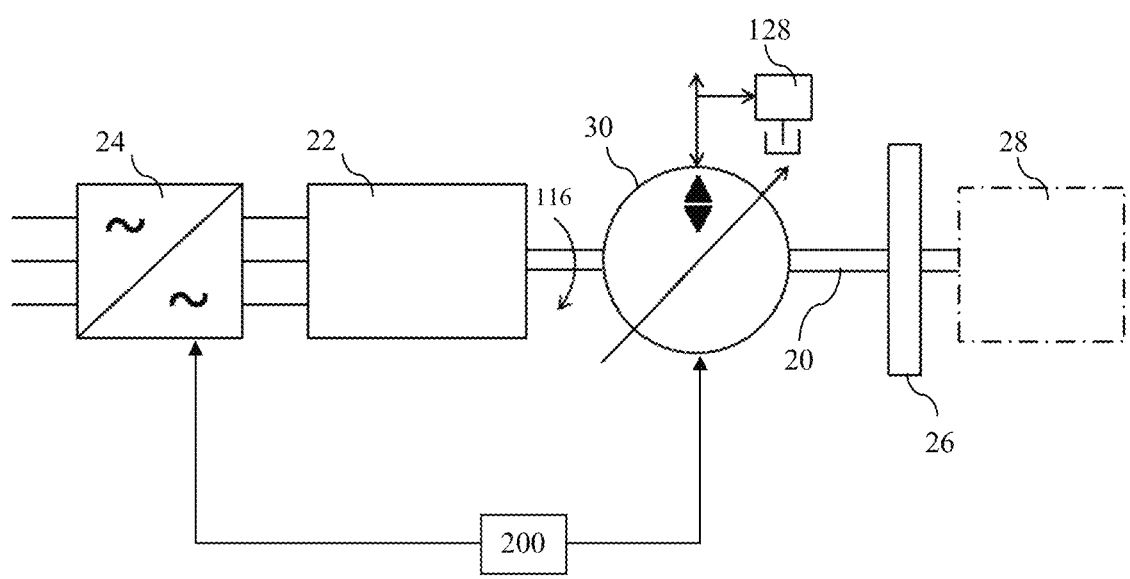
FIG. 2 is a block diagram of the components of an individual hydraulic power unit.

With reference to FIG. 2, an individual hydraulic power unit comprises a rotatable shaft 20, coupled to an electric motor 22, an electronically commutated hydraulic machine 30 which is capable of functioning as a pump or as a motor while rotating in the same direction and a flywheel 26. Thus the rotor of the electric motor, the shaft of the hydraulic machine and the flywheel (where present) rotate together as a rotatable body. An optional dissipater 28 can be coupled to the shaft required for example in case there is positive energy coming from the load that must be dissipated. This would be the case if the load energy exceeded the energy capacity of the rotatable body to absorb it, thus avoiding overspeed of the rotatable body. As an alternative to the dissipater acting directly to reduce shaft speed, it may for example be in the form of a bank of brake resistors connected to the electric motor. Thus incorporation and use of a dissipater allows sizing of the system for the median load case, rather than sizing the system to take all anticipated peaks of power, thus allowing a smaller rotating mass and a faster responding more efficient system or apparatus for displacing an object.

The electric motor is powered by a variable speed drive or a variable frequency drive 24 which enables the electric motor to be driven despite a variation in frequency with the speed of rotation of the rotatable body. The electric motor applies a torque to the rotatable shaft (and therefore the rotatable body) in use in a single direction of rotation. The hydraulic machine has an high pressure fluid line 122 which is in fluid communication with the respective hydraulic actuator. A pressure relief valve 128 provides a connection to low pressure in the event of a pressure excess in the high pressure fluid line.

FIG. 2 shows the three important power flows in the system, Pmotor is the power delivered by the motor, Pload is the power delivered or absorbed by the load, Pflywheel is the power delivered or absorbed by the rotatable body.

Synthetically Commutated Pump-Motor

Figure 3:
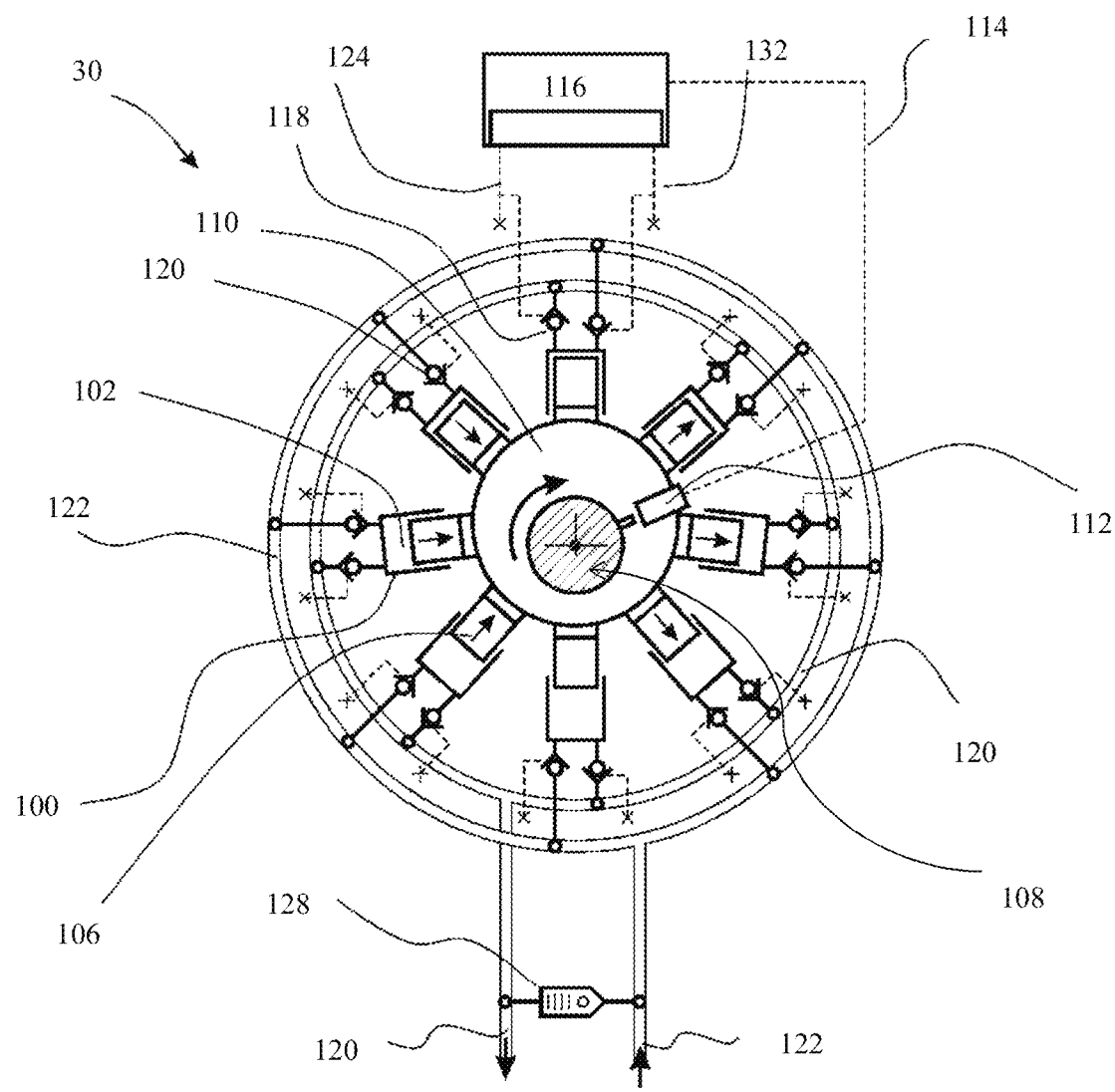
FIG. 3 is a schematic diagram of an electronically commutated hydraulic pump-motor suitable for use with the invention.

With reference to FIG. 3, an electronically commutated hydraulic pump-motor has a plurality of working chambers in the form of cylinders 100 which have working volumes 102 defined by the interior surfaces of the cylinders and pistons 106 which are driven from a rotatable shaft 108 by an eccentric cam 110 and which pistons reciprocate relative to the cylinders to cyclically vary the working volume of the cylinders. The rotatable shaft is firmly connected to and rotates with the rotor of the electric motor and the flywheel (where present). A shaft position and speed sensor 112 determines the instantaneous angular position and speed of rotation of the shaft, and through signal line 114 informs the machine controller 116 of the position and speed of the hydraulic motor, which enables the machine controller to determine the instantaneous phase of the cycles of each cylinder.

The cylinders are each associated with Low Pressure Valves (LPVs) in the form of electronically actuated face-sealing poppet valves 118, which face inwards toward their associated cylinder and are operable to selectively seal off a channel extending from the cylinder to a low pressure hydraulic fluid line 120, which may connect one or several cylinders, or indeed all as is shown here, to the low pressure hydraulic fluid line 26 and optionally to a tank. The LPVs are normally open solenoid closed valves which open passively when the pressure within the cylinder is less than or equal to the pressure within the low pressure hydraulic fluid line, i.e. during an intake stroke, to bring the cylinder into fluid communication with the low pressure hydraulic fluid line, but are selectively closable under the active control of the controller via LPV control lines 124 to bring the cylinder out of fluid communication with the low pressure hydraulic fluid line. Alternative electronically controllable valves may be employed, such as normally closed solenoid opened valves.

The cylinders are each further associated with High Pressure Valves (HPVs) 126 in the form of pressure actuated delivery valves. The HPVs open outwards from the cylinders and are operable to seal off a channel extending from the cylinder to a high pressure hydraulic fluid line 122, which may connect one or several cylinders, or indeed all as is shown here, to the transmission high pressure hydraulic fluid line 28. The HPVs function as normally-closed pressure-opening check valves which open passively when the pressure within the cylinder exceeds the pressure within the high pressure hydraulic fluid line. The HPVs also function as normally-closed solenoid opened check valves which the controller may selectively hold open via HPV control lines 132 once that HPV is opened by pressure within the associated cylinder. Typically the HPV is not openable by the controller against pressure in the high pressure hydraulic fluid line. The HPV may additionally be openable under the control of the controller when there is pressure in the high pressure hydraulic fluid line but not in the cylinder, or may be partially openable, for example if the valve is of the type and is operated according to the method disclosed in WO 2008/029073 or WO 2010/029358.

In a normal mode of operation to carry out a pumping cycle, described in, for example, EP 0 361 927, EP 0 494 236, and EP 1 537 333, the contents of which are hereby incorporated herein by way of this reference, the controller selects the net rate of displacement of fluid to the high pressure hydraulic fluid line by an individual working chamber by either holding the LPV of the working chamber open throughout a cycle of cylinder working volume (in which case there is no net displacement of working fluid to the high pressure line) or by actively closing one or more of the LPVs typically near the point of maximum volume in the associated cylinder's cycle, thereby closing the path to the low pressure hydraulic fluid line and directing fluid out through the associated HPV on the subsequent contraction stroke.

In order to carry out motoring cycles, the controller selects the net rate of displacement of fluid from the high pressure hydraulic fluid line by a cylinder by either holding the respective LPV open during a cycle (in which case there is no net displacement of working fluid from the high pressure line to the low pressure line) or by actively closing one or more of the LPVs shortly before the point of minimum volume in the associated cylinder's cycle, closing the path to the low pressure hydraulic fluid line which causes the fluid in the cylinder to be compressed by the remainder of the contraction stroke. The associated HPV opens when the pressure across it equalises and a small amount of fluid is directed from the cylinder through the associated HPV to the high pressure fluid line. The hydraulic pump-motor controller then actively holds open the associated HPV, typically until near the maximum volume in the associated cylinder's cycle, admitting fluid from the high pressure hydraulic fluid line and applying a torque to the rotatable shaft. The controller selects the number and sequence of LPV closures and HPV openings to produce a flow or create a shaft torque or power to satisfy a selected net rate of displacement.

As well as determining whether or not to close or hold open the LPVs on a cycle by cycle basis, the controller is operable to vary the precise phasing of the closure of the HPVs with respect to the varying cylinder volume and thereby to select the net rate of displacement of fluid from the high pressure to the low pressure hydraulic fluid line or vice versa.

Arrows on the ports 120, 122 indicate fluid flow in the motoring mode; in the pumping mode the flow is reversed. A pressure relief valve 128 may protect the hydraulic motor from damage.

Because the net displacement can be selected on a cylinder by cylinder basis and because, during normal operation, the rotatable shaft rotates quickly and so cylinder displacement decisions are very frequent (e.g. with 12 cylinders on a shaft rotating at 1,500 rpm there is a cylinder displacement decision every 3.33 ms) the net displacement of working fluid by the cylinders can be closely matched to a demand. Furthermore, the decision as to whether to make a net displacement of working fluid during a cycle of working chamber, and what the displacement should be, can be made taking into account the current speed of rotation of the rotatable shaft, thereby enabling a desired rate of displacement of working fluid per unit time to be obtained independently of variation in the speed of rotation of the rotatable shaft. Similarly, if the demand is, for example, for an output pressure to match a demanded pressure, displacement decisions are made frequently, independently of the speed of rotation of the rotatable shaft.

Figure 4:
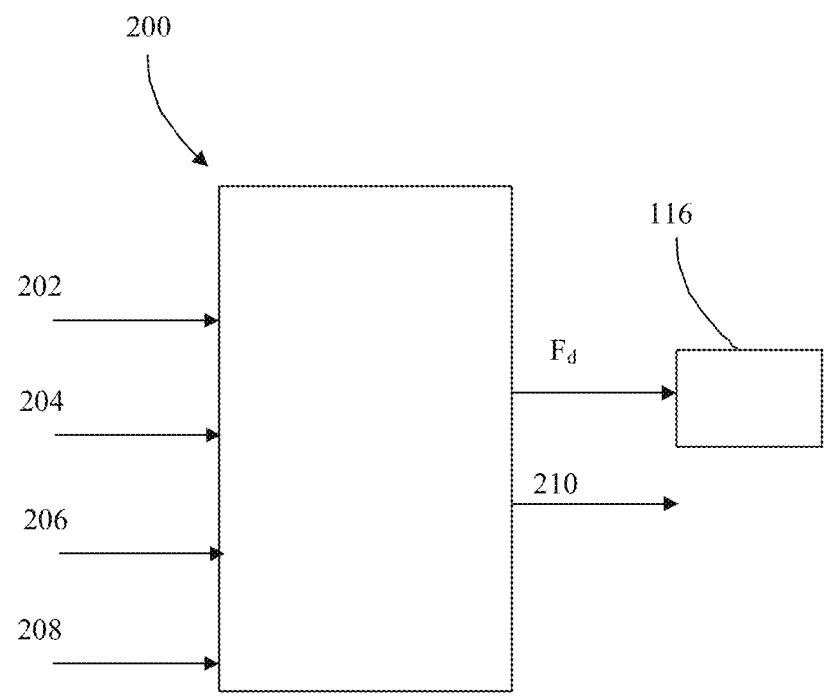
FIG. 4 is a schematic diagram of the hydraulic power unit controller.

FIG. 4 illustrates the factors taken into account by a controller 200 when determining the displacement fraction of each hydraulic machine. In this example, the controller 200 is a controller of an individual hydraulic power unit 6.

The controller 200 receives a shaft position input 202 which can be used to calculate the current position of the rotatable shaft, and from which the rotation speed of the shaft can also be calculated. The shaft position input need not provide a position signal continuously but might for example provide a pulse whenever the rotatable shaft is at a specific position (e.g. a position encoder using a Gray code), from which position and speed of rotation can be inferred. Alternatively, speed and position signals may be received. The controller also receives measurements of the pressure 204 in the hydraulic line 122 and the position 206 of the actuator 8, as well as demand data 208 specifying a time varying demand for the pressure in the hydraulic line (or in the actuator, which is typically substantially the same) and/or a time varying target for the position of the actuator.

The demand data may indicate the target pressure and/or position of the actuator in real time. In an example, the pressure demand and/or position demand is received from the system controller 4 which coordinates the separate hydraulic power units. However, in some implementations, the demand data specifies parameters of, or is a time series indicating the demand during, an individual displacement cycle. In this case, there is typically a time synchronisation signal or procedure between individual hydraulic power unit controllers 200 and/or the system controller 4. In some embodiments, the system controller carries out the function of the hydraulic power unit controllers.

The controller determines and outputs the fraction ($F_d$) of the maximum output displacement (when pumping) or input displacement (when motoring), per revolution, of the hydraulic machine required for the output pressure and/or position of the actuator to best follow the demand, taking into account sensor signals/measurements. In order to do this, the controller takes into account the speed of rotation of the rotatable shaft. $F_d$ is a fraction of the maximum output of the machine per revolution, and varies between 0 (which indicates that every cylinder carries out inactive cycles) and 1.0 (which indicates that every cylinder carries out active cycles). In embodiments where each cylinder carries out only full mode (100% of maximum displacement) and idle mode (0% of maximum displacement) cycles, $F_d$ is the fraction of cylinders which are selected to carry out active cycles. A demand rate of displacement per unit time is first calculated and then this is divided by a factor proportional to the speed of rotation of the rotatable shaft (revolutions per unit time) to determine the demanded rate of displacement per rotation, $F_d$. The hydraulic machine then makes cylinder selection decisions to match $F_d$ by an algorithm such as that disclosed in EP 2851585 (Caldwell), the content of which is incorporated herein. Thus the required displacement or pressure can be obtained independently of the speed of rotation (provided that it is sufficient that the required $F_d$ does not exceed 1.0).

Separately, the controller provides an electric motor control output 210 which controls the electric motor 22. In some embodiments, the power input to the electric motor is essentially constant in use. In other embodiments, the control of the electric motor is varied with time. The control of the electric motor may be implemented by a separate electric motor controller and the electric motor controller is discussed further below.

The Electrical Variable Speed Drive (VSD) receives shaft speed and controls the electric motor speed in a closed loop fashion. This control loop will typically have a low gain, which allows the speed to vary within the allowable speed band around the demand speed (between the upper and lower speed thresholds). The variation in speed is therefore primarily influenced by the energy flows of pumping and motoring of the hydraulic machine. It is the variation in speed which allows energy to be stored in the rotational kinetic energy of the rotating body and reused by the actuator rams. Allowing the hydraulic machine to dominate speed control means that the inverter provides the minimum energy required (and thus minimum current) to influence speed. Minimising inverter energy input requirement allows the electric drive system to be designed to only make up known system losses, thus minimising its electrical power consumption.

In some embodiments, the electrical VSDs are Variable Frequency Drives (VFDs).

In general during operation, within each hydraulic power unit, the rotatable body rotates (in a single direction) driven by the electric motor, where the motor applies a torque in that same direction. The hydraulic machine initially pumps hydraulic fluid from the low pressure line to the high pressure line which extends to the respective actuator, thereby displacing and deforming the blade. As displacement and deformation takes place, the speed of rotation of the rotatable body slows and rotational kinetic energy of the rotatable body is transferred to pressure energy in pressurised hydraulic fluid in the high pressure line. This pressure energy is subsequently transferred to elastic and/or gravitational potential energy of the blade as it is displaced and deformed. The electric motor provides additional energy in the form of rotational kinetic energy to the shaft connected to the pump which in turn provides pressurised fluid to the high pressure line thus leading to deformation of the blade, but the majority of the input energy to the pump typically comes from the stored rotational kinetic energy of the rotatable body.

In a low power requirement mode, where there is no or only minor variation in the speed of rotation of the rotatable body speed, it is acceptable to rely on the electric motor VSD to meet the input power, as determined by the instantaneous ability of the motor to provide power. When in a condition of high energy stored in the load (e.g. a turbine blade bent to a large degree), the rotatable body is typically rotated at a lower speed of rotation, at lower end of the range of possible speeds. Similarly in a situation of low energy stored in the load (e.g. a turbine blade with only a minor bend), the rotatable body may be rotated at the higher end of the range of possible speeds. Furthermore, at states where the load has an 'in-between' energy level, the speed of the rotatable body is typically kept at an intermediate speed. It is advantageous in that it can be used to extend the frequency of operation of the machine by changing that speed set point.

Thereafter, elastic potential energy of the blade drives the actuator to return, providing pressurised fluid to the hydraulic machine which consequently carries out motoring cycles, thereby accelerating the rotatable body and so storing kinetic energy in the rotation of the rotatable body. The rotatable body continues to rotate in the same direction and the electric motor continues to input energy which is stored as kinetic energy of the rotation of the rotatable body. During a full cycle, the electric motor inputs sufficient energy to replace that which is lost, e.g. as heat. As the majority of the energy is efficiently transformed in a cycle between the kinetic energy of the rotatable body and elastic and/or gravitational potential energy in the blade, the electric motor can be lower rated than would be required if it had to provide all of the torque required to rotate the shaft of the pump to drive the actuators to displace the blade.

During said cycle between energy types, the rate of displacement of working fluid per unit time (or output pressure) is controlled taking into account the speed of rotation of the rotatable body. The hydraulic machines allow the rate of displacement of working fluid per unit time to be varied independently of the rate of displacement of working fluid per rotation of the rotatable body, thereby enabling the displacement of working fluid and/or the pressure in the actuator/position of the actuator to be controlled and varied according to a desired time-variation despite the changing speed of rotation of the rotatable body. Furthermore, this ability to adjust for the speed of rotation of the rotatable body enables the speed of rotation of the rotatable body to be allowed to vary substantially, thereby better facilitating energy storage and regeneration.

Figure 5:
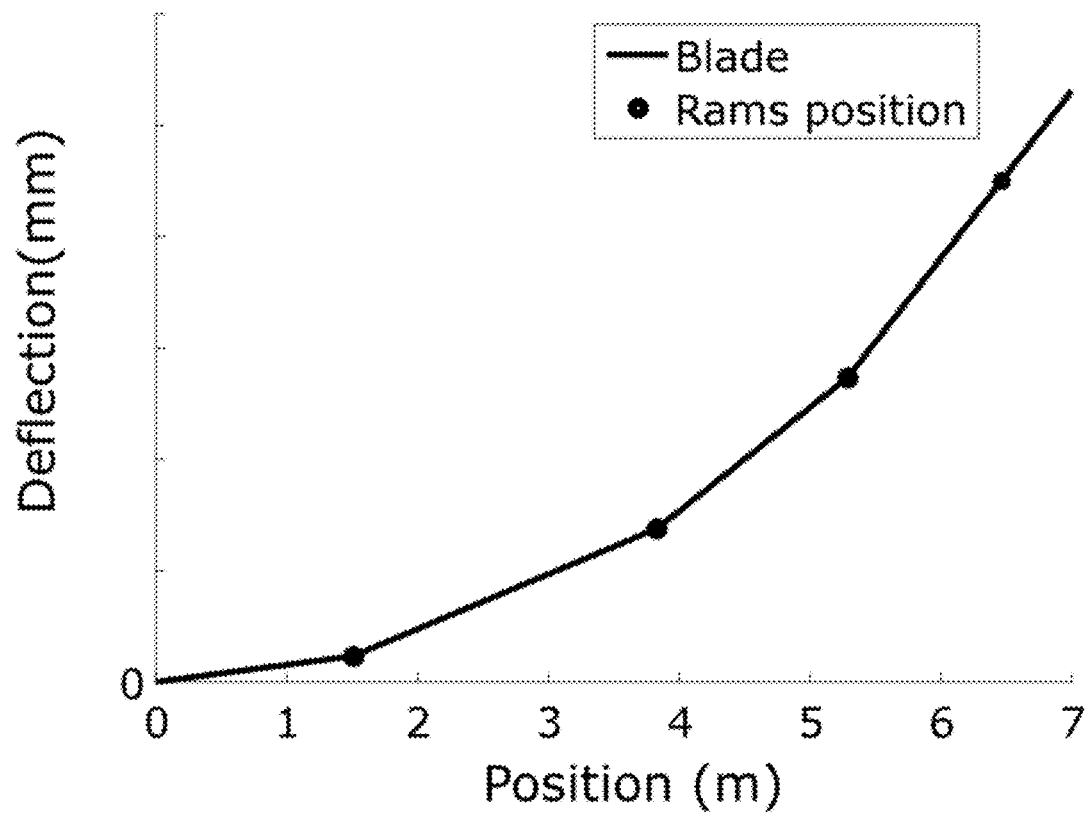
FIG. 5 is a graph of the maximum deflection of points along the length of a turbine blade.

FIG. 5 is a graph of the maximum deflection of points along the length of a wind turbine blade. It can be seen that the four actuator rams in this example (the four rams of FIG. 1, with the first actuator ram as being closest to the root, and the fourth actuator ram as being closest to the tip) require to be displaced by substantially different amounts, with the first having the smallest requirement and the fourth having the greatest requirement.

Figure 6:
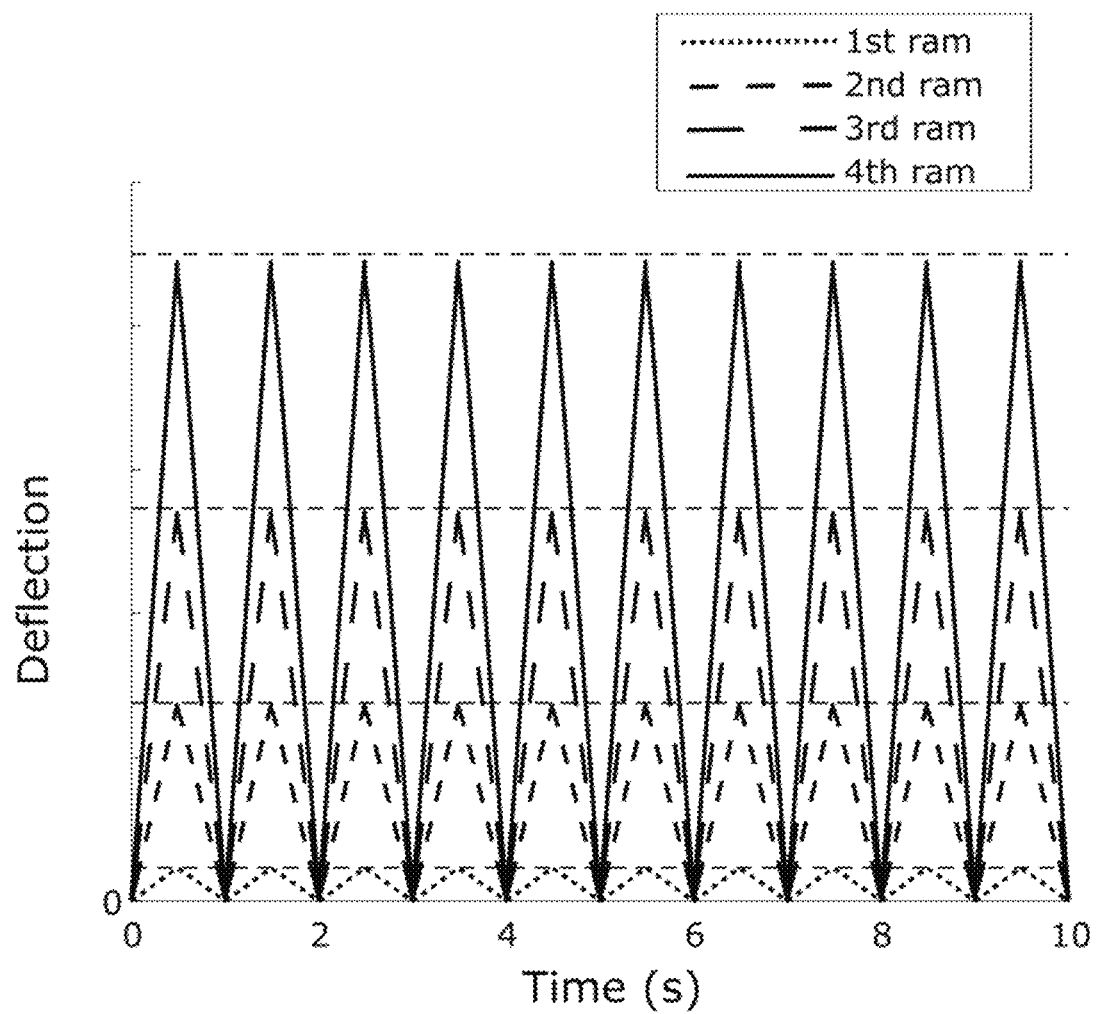
FIG. 6 is a graph of the time variation in the displacement of each of the four actuators (and corresponding deflection of the connected object), over a number of cycles.

FIG. 6 is a graph of the time variation in the displacement of each of the four actuator rams, over a number of cycles.

The figures are drawn on the basis that the blade is in a first mode and all rams are in phase. Alternately, it is possible to test in different modes, where for example rams may be out of phase, and where they are out of phase this is usually by 180 degrees.

In order to implement the linear variation in displacement with time, which is different for each actuator, the hydraulic power units must each displace different amounts of hydraulic fluid per unit time, which requires a non-linear variation in the rate of displacement per rotation of the respective rotatable body, as the respective rotatable bodies slow.

Figure 7:
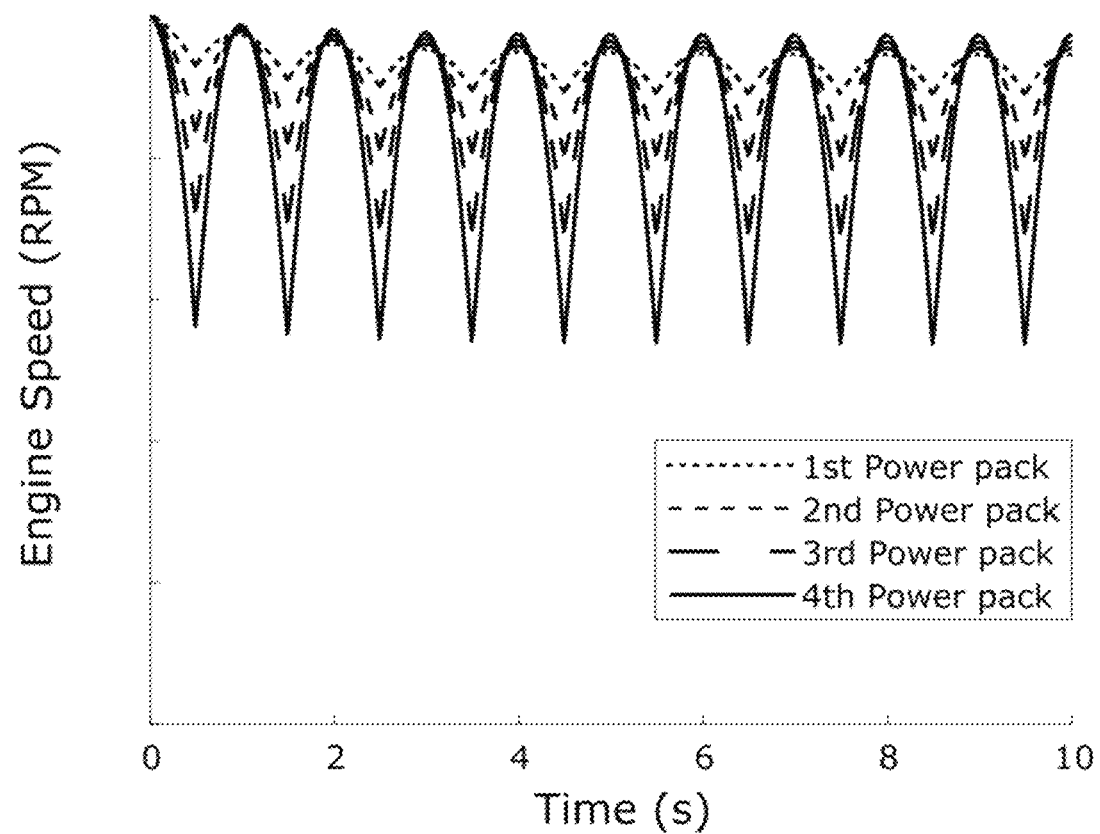
FIG. 7 shows the variation in the speed of rotation of the respective rotatable bodies (and their rotatable shafts)

FIG. 7 shows the variation in rotatable body rotation speed, illustrating how the hydraulic power unit connected to the ram which must displace the furthest, and being at the position with the blade having the greatest displacement, comprises an engine with speed which varies to the greatest extent (as compared to the other actuator rams and hydraulic machines.

Figure 8:
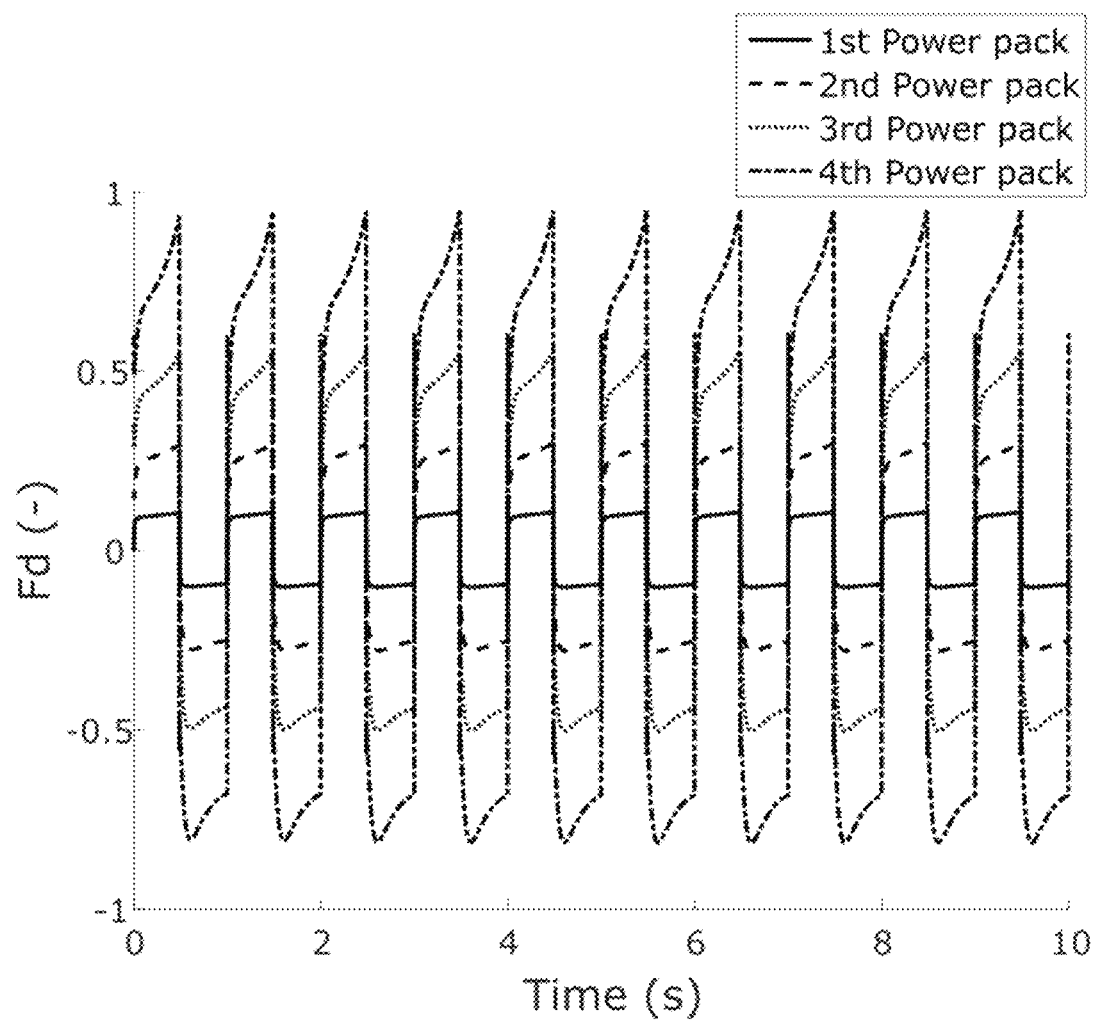
FIG. 8 shows the variation in the fraction ($F_d$) of the maximum displacement per rotation of the rotatable body of the hydraulic machine in each hydraulic power unit.

FIG. 8 shows the variation in the fraction ($F_d$) of the maximum displacement per rotation of the rotatable shaft of the hydraulic machine in each hydraulic power unit (in this case labelled 'power pack'), which is notably non-linear. It can be seen that the speed of rotation varies most (drops during pumping and increases again during motoring) for the hydraulic power unit which drives the part of the blade closest the tip, which is displaced most meaning the volume of displaced fluid is relatively high. The fourth hydraulic power unit is hydraulically connected to the actuator closest the tip, and the first hydraulic power unit is connected to the actuator that is closest the root.

The hydraulic power units which drive the parts of the blade closest to the root, which require least displacement thus having a relatively small volume of fluid displaced, might drive multiple parts of the blade using multiple actuators. The power units which drive parts of the blade closest to the tip, which require the most displacement might be ganged together to enable them to meet the flow requirement to drive a single actuator. To facilitate this, in some embodiments, a single hydraulic power unit may have two (or more) separate independently controllable high pressure hydraulic fluid lines, each of which is connected to a different hydraulic actuator. As well as a first one or more working chambers supplying fluid to (and receiving fluid from) a first hydraulic actuator, a second group of one or more working chambers mounted to the same rotatable shaft, and typically within the same housing, are controlled using electronically controlled valves in the same way to supply fluid to (and receive fluid from) a second hydraulic actuator, thereby independently meeting a first time varying demand (for position, pressure, force etc.) of the first actuator and a second time varying demand (for position, pressure, force etc.) of the second actuator. This use of multiple independently controlled hydraulic lines (services) is most appropriate for the actuators which move least (the first and second in this example).

In some embodiments, the capacity of the hydraulic machines may differ, such that the relative size of hydraulic machines in the hydraulic power units, may vary between the four actuator rams (reflecting the required maximum displacement volumes of the four rams).

Figure 9:
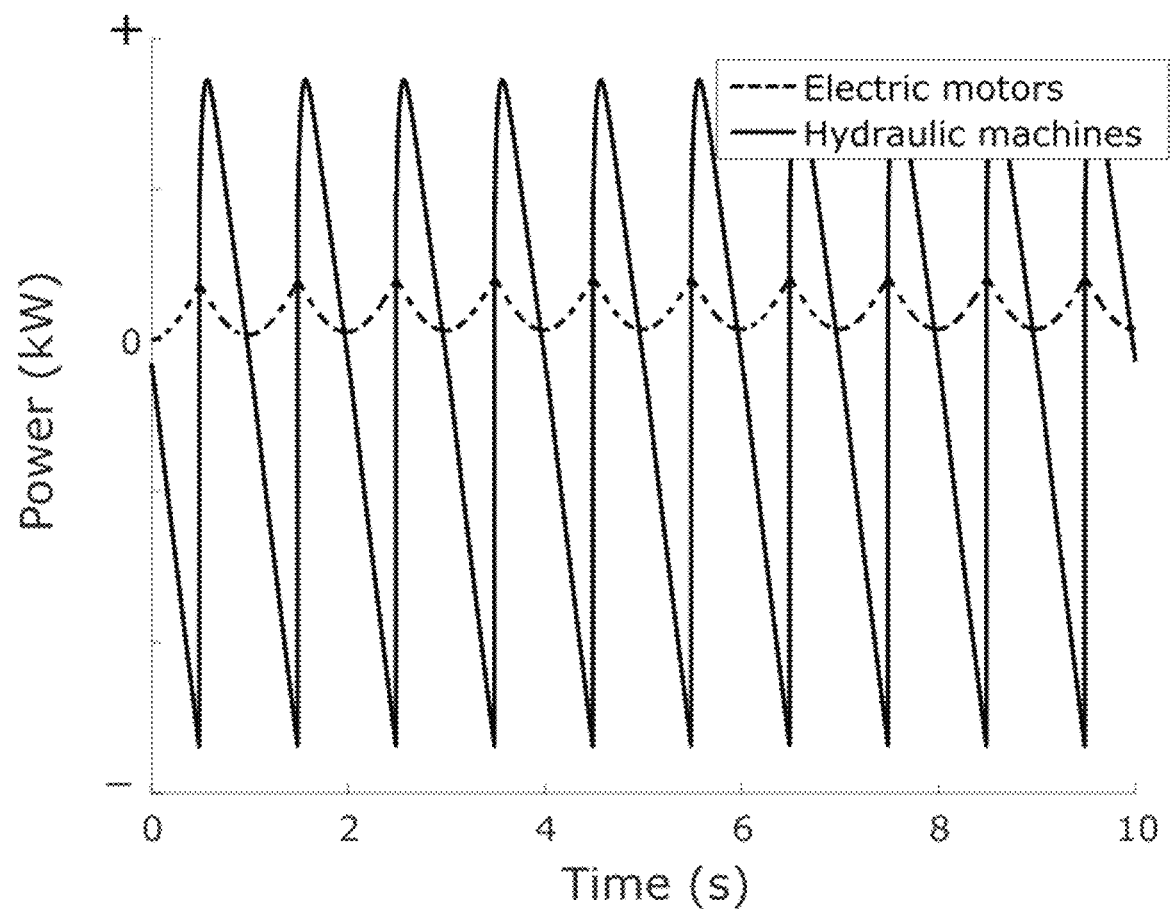
FIG. 9 is a graph of the power output with time, one line for the electric motors and another line for the hydraulic machines, summed for each hydraulic power unit.

FIG. 9 compares the power output of the electric motor (or all the motors together) with the total power output of the hydraulic machine (or machines) which drives the actuator in an example implementation according to the invention. It can be seen that the substantial majority of the energy used to displace the blade does not come from the instantaneous power output of the electric motor but is regenerated from the rotational kinetic energy of the rotatable body. The peak of the electric motors curve illustrates a relatively small input power by motors, in phase with the movement of the hydraulic machines which cycle between pumping and motoring. The input power provided by electric motors corresponds to the losses in the system, due to friction, waste heat etc.

Figure 10:
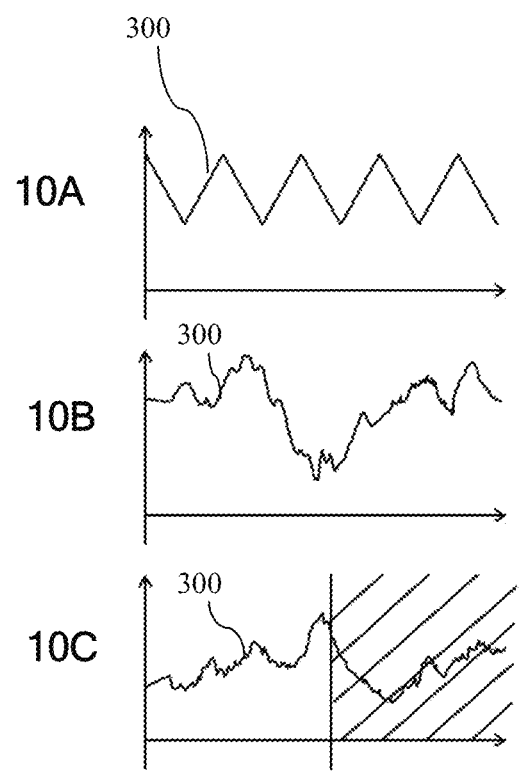
FIGS. 10A through 10C are graphs of the example variation of displacement (vertical axis) of an actuator with time (horizontal axis), for (10A) a periodic test, (10B) a predetermined arbitrary waveform and (10C) an unpredictable arbitrary waveform. The right hand side of image 10C uses hatching which signifies that the waveform is not prerecorded or known (the displacement demand might be determined in real time and not known prior to operation)

With reference to FIG. 10, the examples described herein relate to implementations in which the displacement 300 of the actuator varies cyclically with time. In some embodiments, the displacement (or pressure or actuator position) may vary with time according to a fixed frequency and amplitude waveform, as shown in FIG. 10A. In one embodiment, the displacement (or pressure or actuator position) may vary with time according to an arbitrary predetermined waveform, as shown in FIG. 10B. This is useful, for example, for testing the response of a vehicle suspension to a simulated terrain profile. In the cases of 10A and 10B, the demand data may comprise a pre-stored waveform representing the demanded displacement (or pressure or actuator position) variation. In other embodiments in case of example 10C, the time variation of displacement (or pressure or actuator position) is not predetermined but is calculated in real time. In this case, the demand data is calculated in real time or received from an external source of real time data. An example application would be a flight simulator which is moved in response to user controls. In the case of the examples of FIGS. 10B and 10C, displacement demand moves predominantly in one direction at a time (in alternate directions), with a corrective centralising strategy of the controller seeking to move the actuator in the opposite direction and return the actuator away from an end stop toward the centre of its range of motion. Thus the actuator displacements may average a central position, but not have an explicitly cyclic nature.

It is useful to simulate the operation of the system prior to deployment to determine demand data which would lead to sustainable function without breaching any operating bounds such as:
the speed of rotation (of the rotatable body) exceeding a maximum limit
the speed of rotation (of the rotatable body) falling below a minimum limit
the output pressure exceeding a maximum limit
the output pressure falling below a minimum limit
a requirement to use the energy dissipater (where present)

The conditioning (e.g. optimisation) process may involve varying the execution rate of the test sequence. E.g. the frequency of the test cycles (where there is a cyclic oscillation such as shown in FIG. 10A). It would be unlikely to amend the amplitude or force of the displacement, as that tends to be dictated by the object being tested. In one example it would be desirable to test the blade to 50% of its theoretical breaking strain as quickly as possible. Optimisation would allow this test to be done as quickly as possible. Conditioning may therefore involve changing the speed of displacement. Another option would be self-optimisation involving report back average power of electric motor, increase average speed until the power increases.

In other examples, test cycles are continued until destruction is achieved, through either planned, or unplanned mechanical failure of the object under test. It is desirable to prevent further damage by the means of system shutdown comprising stopping operation of the system at the start of this failure detection, and to subsequently analyse the root cause of failures. The apparatus, or system comprising the apparatus, could be used for detecting the beginning of structural failure or of a precursor to failure of the object under test.

During testing of an object, the temperature of the object may gradually increase, possibly due to creep of the object material. Progressive failure of the object may be indicated by a change in the map (map defined below) from one cycle to the next.

In some embodiments, the relationship between HP manifold pressure and the displacement of hydraulic fluid into or out of the HP manifold by the working chamber(s) in communication with the HP manifold, is used to determine whether one or more failure conditions are met, to thereby detect a failure, or determine a risk of failure, of the object being displaced or of the hydraulic system itself.

One skilled in the art will appreciate that it is possible to accurately measure the net displacement of hydraulic fluid into or out of the HP manifold by a working chamber. For example, the time within cycles of working chamber volume of the opening or closing of the HP and/or LP valves indicates the net displacement of hydraulic fluid for each individual active cycle and the speed of rotation of the rotatable shaft determines the number of cycles of working chamber volume per unit time. The displacement may also be affected by factors such as the precise value of the pressure in the HP or LP manifolds, properties of the hydraulic fluid etc. In any event, it is possible to accurately estimate the volume of working fluid displaced into or out of the HP manifold by the working chambers per cycle, per unit time or (by integration) in total since a reference point. If control of the low pressure and high pressure valves is sufficiently accurate, the net displacement can be calculated (rather than wholly measured). The pressure in the HP manifold can be monitored, for example, with a pressure sensor. Using this known pressure, and seeing as the area that this pressure is acting on is known, force can be determined (i.e. force acting on or by the respective actuator ram).

Thus, in an example embodiment, the variation in measured pressure in the HP manifold with total volume of hydraulic fluid displaced into the HP manifold since a reference point (e.g. minimum of rotatable shaft speed, or since the rotatable shaft speed reached a certain value) is measured and stored. It can be used to calculate a map of the relationship between displaced hydraulic fluid and HP manifold pressure. This map could be determined theoretically, where the map is based on theoretical pressure change for a given displacement, or empirically for example during operation (potentially using as few as two cycles of motoring and pumping, or many such cycles).

Any discrepancy between the measured HP manifold pressure during operation, for a given volume of displaced hydraulic fluid, and what is indicated by the stored map is indicative of a fault. A fault event can be generated responsive to the difference meeting one or more fault criteria (e.g. that the pressure is lower (or higher) than expected for a given displacement of the hydraulic (e.g. ram) actuator by more than a threshold amount, or is changing over time by more than a threshold rate of change).

It is not necessary to use an absolute value of the amount of hydraulic fluid displaced into or out of the HP manifold (relative to a reference). It can be sufficient to look at the change in pressure for a given net displacement (over one or more cycles of working chamber volume) into or out of the HP manifold at a given pressure.

One or more fault criteria might indicate a failure (i.e. that the object, or a part of the hydraulic machine) has failed, or is failing or is at risk of failing. One or more fault criteria might be stop criteria responsive to which the hydraulic apparatus begins a stopping procedure (or immediately stops). In the stop procedure, hydraulic machine and motor are regulated to unload the hydraulic circuit. The hydraulic machine and motor may be regulated to cease actuation of the actuator in a controlled manner, i.e. such that actuation is stopped at an appropriate and convenient point in the cycle, for example at or around the middle of the range of motion, such that the minimum possible level of elastic energy is stored in the object). Controlled unloading includes the return of the hydraulic system to an unloaded condition (i.e. with no high pressure, or relatively high pressure working fluid in the hose between the actuator and the hydraulic machine). Unloading is an important aspect of depressurising a system to make it safe, such that an inactive or deactivated system is less likely to contain pressurised hydraulic regions, and thus stored energy, which may be released at an inopportune or even dangerous moment or way during disassembly, servicing, or invasive inspection of some part of the hydraulic circuit.

The controller may monitor the pressure of at least one of the multiple independently controlled hydraulic lines (services) and/or of at least one of the actuator rams, record the displacement produced, and thus the controller may use the pressure and displacement to determine how much force is required to move the blade to a given position. Taking into account temperature changes, the relationship of the cycle of pressure to displacement should be highly repeatable over a pumping motoring cycle, and may be recorded in the form of a map, which may be stored in the controller. Any significant deviation in this pressure/displacement map, as compared to a standard cycle may provide an indication of structural changes and/or potential failure in the blade, or of apparatus or system issues. Such detected changes or issues should normally be used as an indication to stop the test.

The system controller could monitor the pressure to displacement relationship for a number of cycles at start-up (for example during 5 cycles after the system has stabilised) and generate the map based on these cycles. The operator could set a controller parameter of how quickly or how far to let it deviate from this map (indicating a system change) before the controller should autonomously shut down operation.

Advantages or benefits include that using the pressure and displacement indications can reduce the requirement for instrumentation to generate shutdown conditions. It also means the controller directly measures the inherent mechanical behaviour of the blade through the test rig (rather than indirectly by use of an accelerometer, or other such sensor, to measure the behaviour).

The test may involve a test sequence of displacements, where an operator monitors the test rig, and chooses the speed of rotation—essentially this would not typically be an unmanned self-optimising system.

This can be achieved by simulating operation using predetermined demand data (i.e. a specification of the variation of displacement, pressure or position of an actuator with time, typically for each of a plurality of hydraulic power units in connection with the same object at the same time) and iteratively amending the demand data to avoid operation breaching set bounds or to otherwise condition (e.g. optimise) performance (e.g. to minimise power output or maximise the effectiveness or relevance of a test procedure). This conditioning procedure may include:

trimming/applying a filter to a demanded value of displacement, position or pressure, which filter may vary with time, applying power limits (e.g. to ensure that the prime mover power, or hydraulic machine power is respected), scaling the demand data, or part thereof, in time, scaling the demand data, or part thereof, in amplitude, otherwise modifying the time between points in an operation cycle (e.g. time between reaching and leaving maximum power The conditioning or optimisation procedure may also be carried out experimentally in a test phase instead of virtually in a simulation phase.

Figure 11:
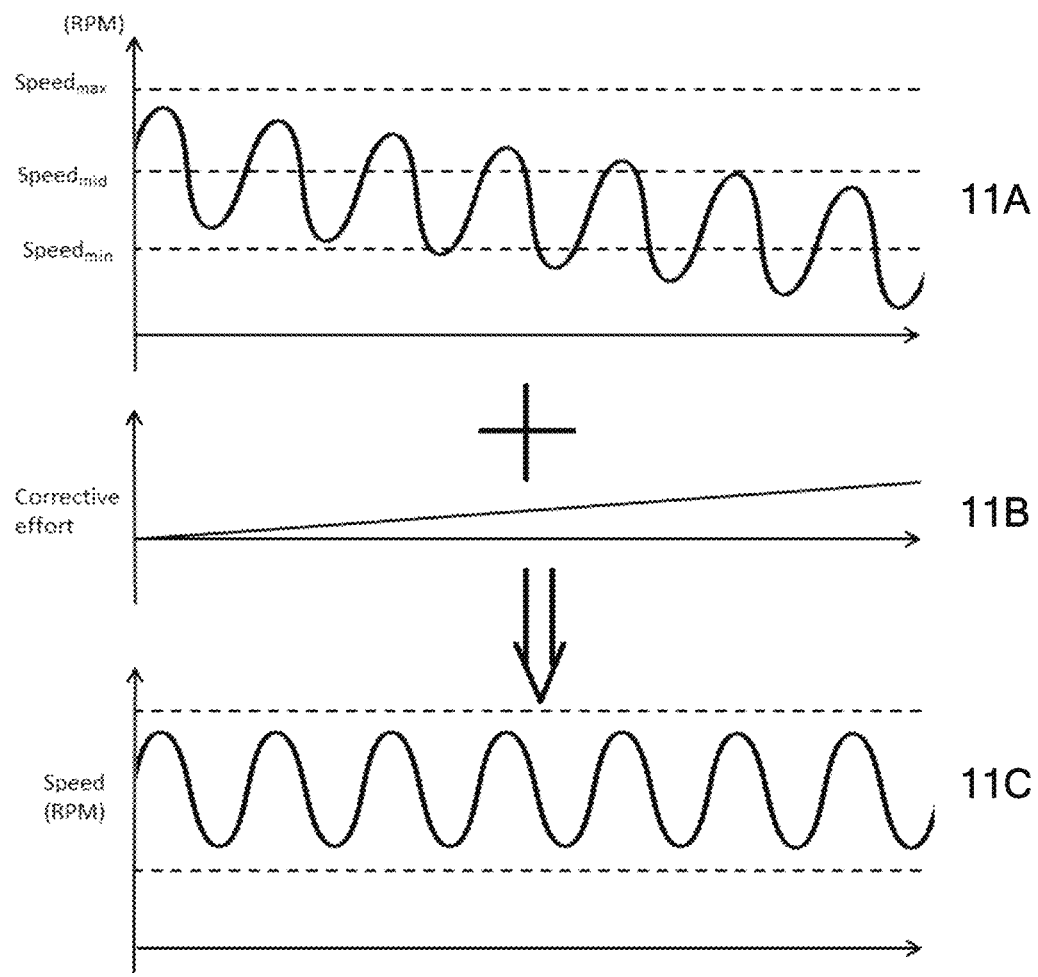
FIGS. 11A through 11C illustrate a conditioning or optimisation procedure to avoid shaft speed dropping below a predetermined minimum speed during subsequent operation.

For example, FIG. 11A illustrates the cycling shaft speed, the average of which decreases with time during operation of the apparatus as energy is lost to friction, heat etc. from one cycle of displacement to the next. If insufficient input of power is provided by the electric motor to make up for these unknown losses, this leads to a steady decline of the average speed and shaft speed will drop below speed$_{min}$. In this instance, a change in the moving average of the cycling shaft speed is indicative of average energy supplied to or used in the VSD/motor being different from average energy consumed/supplied by the mechanical system. However, by applying a trim (a consistent, possibly varying, corrective input which provides an additional torque command in order to stabilise a rotation speed or maintain it at a target speed) on the electric motor drive (VSD) to raise/lower gain current to the correct level, this will give stable operation. Trim is usually described in reference to the electric motor torque, but may also be described in terms of electric motor power trim. Gain is a multiplier factor applied to the difference between the actual measured speed and the speed reference. Minimising electrical power consumption of the system via control means requires sizing the flywheel appropriately (which necessarily involves knowing the upper speed limit).

More specifically, the rotatable body (including any flywheel) must be capable of storing the maximum energy that a respective actuator ram (or rams) might provide. The control system will monitor shaft speed, as well as actuator ram pressure, and potentially actuator ram position. Energy in the actuator ram working chamber is a function of the actuator ram pressure, and actuator ram position. It is desirable to prevent the electric drive system (comprising the electric motor, and VSD or similar motor drive) and/or the hydraulic drive system (comprising hydraulic machine and actuator ram) from adding any rotational kinetic energy which would take shaft speed above maximum shaft speed (maximum 'rated' shaft speed). The control system monitors the coefficients including pressure/position/shaft speed, and determines when enough stored energy is captive in a pressurised actuator ram to motor the connected hydraulic machine, and rotate the corresponding rotating shaft (and connected inertia) to the maximum allowable speed of the shaft. When it makes this determination, it stops the input of further rotational kinetic energy from the electric motor. After stopping of the electric motor, the hydraulic machine may continue to motor receiving pressurised hydraulic fluid thus providing shaft torque, and adding to the rotational kinetic energy. If the determination was made and executed correctly, the hydraulic machine may continue to receive all pressurised fluid in the hydraulic ram, but will not cause shaft speed to exceed the maximum shaft speed. This allows the system to recapture the maximum possible amount of energy from the pressurised ram.

The controller or human operator trims what that 'gain block' is. If the speed is falling, then the controller or human operator needs to raise the gain, such that the oscillating speed rises. With the cumulative effect shown in FIG. 11C, the peak oscillating shaft speed remains within the upper limit $speed_{max}$ and lower limit $speed_{min}$, and can be maintained indefinitely during operation as inferred from FIG. 11C.

Figure 12:
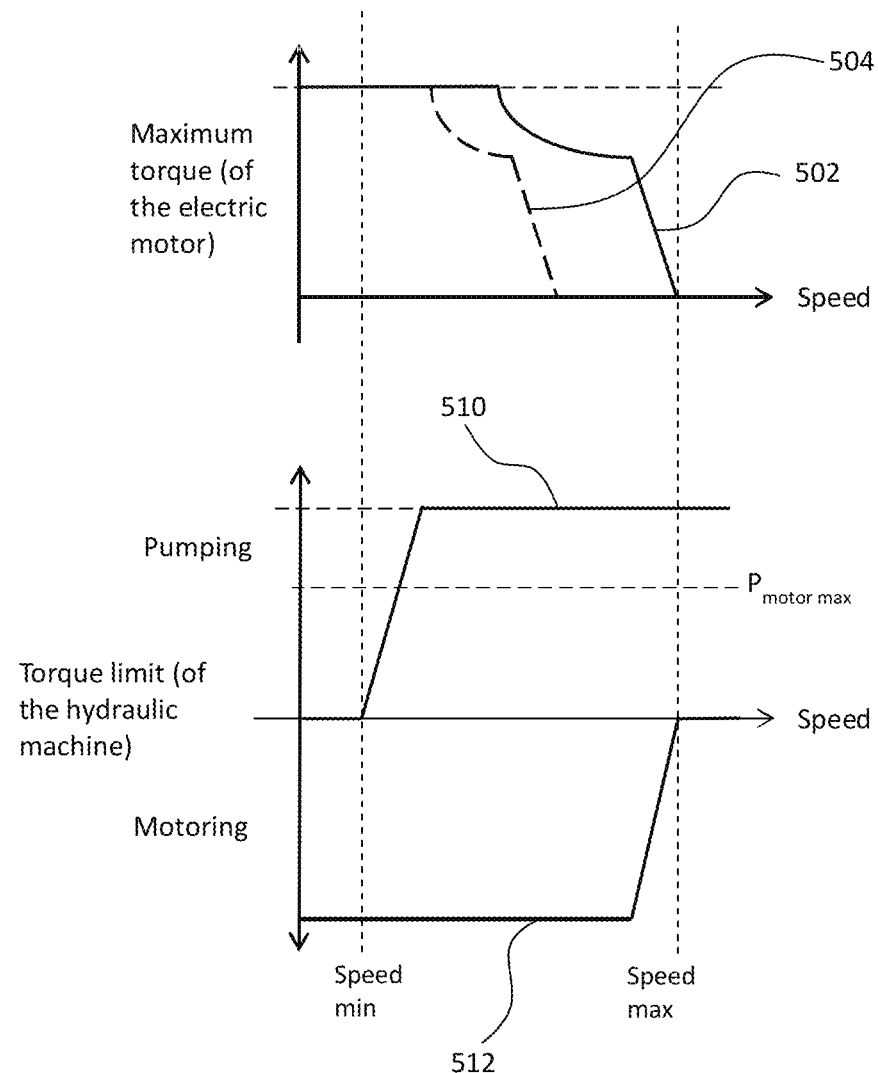
FIG. 12 illustrates the variation in the maximum power output of an individual hydraulic power unit with speed of rotation.

FIG. 12 graphs show the upper limit of power which can be generated during pumping, which varies with the speed of rotation of the rotatable body. Similarly, the amount of power which can be absorbed during motoring also has a limit, which also varies with speed of rotation. In abnormal conditions, if excessive power is returned by the object during motoring, the excess high pressure hydraulic fluid may be dissipated, for example using a pressure relief valve. It can be seen that the torque limit varies with speed, for both pumping and motoring of the hydraulic machine, and of the electric motor. Dashed line 504 illustrates the torque associated with a lower instantaneous target flywheel speed.

Figure 13:
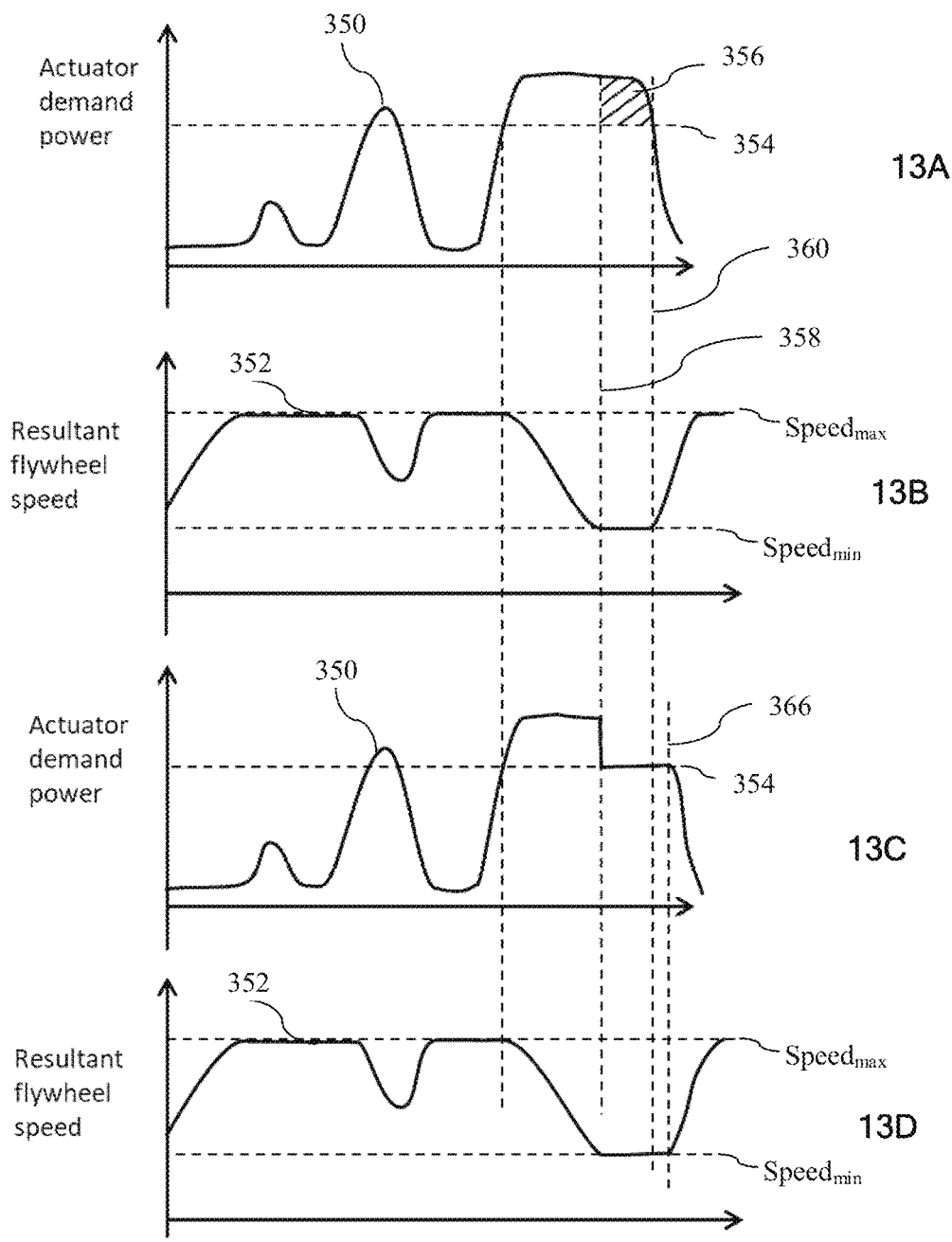

FIG. 13 show the variation of flywheel speed with power. In the illustrated embodiment, the control strategy seeks to maintain the flywheel at maximum speed ($speed_{max}$) by default, thus in a 'ready' state to provide energy in excess of the electric motor's ability. FIGS. 13A and 13B represent operational cycles achieved before conditioning (e.g. optimisation), and FIGS. 13C and 13D represent operational cycles achieved after conditioning (e.g. optimisation).

FIGS. 13A and 13C each illustrate the actuator demand power 350 over time and FIGS. 13B and 13D each illustrate the corresponding speed of rotation 352 that would result during an operation cycle. FIG. 13 illustrate a boundary condition where the control strategy allows the speed of rotation of the rotatable body to reach both the maximum and minimum speed thresholds, but seeks to prohibit the speed of rotation from dropping below the minimum.

A primary benefit of the invention is due to the use of energy stored in rotational kinetic energy of the rotatable body (possibly including flywheel), the power output can temporarily exceed the steady state power limit of the electric motor 354. If a physical rig was used to process an unconditioned (non-optimised) demand from which the illustrated actuator power demand characteristic arises, it can be seen that after time 358 the unconditioned (non-optimised) demand could not be satisfied using the specified system, and it would not be able to completely meet the level of demand between time 358 and 360. This would for example result in the actuator not being displaced to the desired extent.

Excess power (shown in FIGS. 13A and 13C, as the unhatched areas between line 354 and line 350) is obtained from the decelerating the rotatable body. When the actuator power exceeds the limit 354, the speed of rotation will decelerate. If the speed of rotation reaches the minimum speed ($speed_{min}$), then the output power provided to the actuator becomes limited by the available input power (which in this case would result in a deviation from the demanded cycle). This might occur if running an unconditioned (non-optimised) demanded cycle, which would lead to a failure to follow a demand because the system has reached its power limit. The hatched region 356 represents the power over a period of time that the system is unable to meet, thus corresponding to a demand (not illustrated) that the specified system is unable to meet. Such potential deficiency may be detected by running a simulation of such unconditioned (non-optimised) demand data, and thus a conditioning (e.g. optimisation) phase should be performed before running the demand data on a physical test rig.

Comparing FIG. 13B to 13D, 13D shows a longer period for recovery, after time 358 of the rotating body/shaft to $speed_{max}$ for the conditioned (e.g. optimised) input. Recovery of flywheel speed only starts at time 366 (FIG. 13D) instead of earlier time 360 (FIG. 13B). However, such a conditioned (e.g. optimised) cycle is one that can feasibly be carried out (i.e. without violations of power limits, and thus there will be no requirement for avoidance action (e.g. a sudden drop in $F_d$) during operation). The conditioned (e.g. optimised) cycle has a power demand that as closely as possible meets the unconditioned (non-optimised, e.g. initial) one. Thus modifications which arise from the conditioning process may slightly distort the demanded cycle, but in the example of FIG. 13, allow the test rig to catch up with the cycle at the end of the power limit phase (i.e. power limit phase is extended from time 360 and 366, and catch up recovery occurs after time 366).

Figure 14:
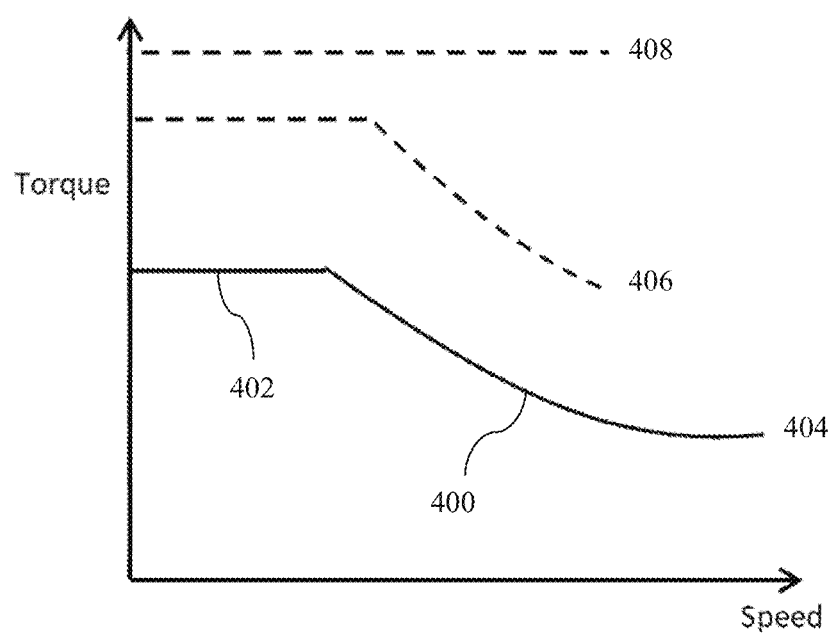
FIG. 14 illustrates how the torque limit of the machine varies with speed of rotation.

With reference to FIG. 14, the maximum torque of the hydraulic machine is represented by line 400, and thus maximum displacement (for full stroke operation of the machine) varies with speed of rotation. 402 is the continuous torque limit of the electric motor. 406 is the instantaneous power limit. 404 is the continuous power limit. 408 is the instantaneous power limit of the hydraulic pump (i.e. full torque at all speeds of rotation). The continuous sustainable power (and therefore torque) limit 404 drops as speed of rotation increases, although the short term power limit 406, which can be sustained temporarily using rotational kinetic energy, will always be higher. In practice, the maximum theoretical torque of the hydraulic machine, the torque represented by line 408, is not reached, and 408 always exceeds 402, 404, and 406.

In general, during operation, the primary input of energy into the system is through the electric motor, the power output of which is regulated. Ideally the power output is independent of the speed of rotation of the rotatable body and in an example this is achieved by using a variable speed drive (VSD), which is a type of electric motor drive (i.e. it drives the electric motor) and controller that is usually used to drive a 3-phase electric induction motor by varying the frequency and current applied to the motor.

An input to the VSD is sensed shaft speed. In a first embodiment, the VSD is controlled to achieve a desired shaft speed and have low gains in its speed control loop (with trim to make up for losses). These low gains will allow the speed to vary, driven by the hydraulic machine, leading to an oscillation RPM (see FIG. 11C). In a second embodiment a 'system controller' provides the VSD a torque or speed demand based on the state of charge of the hydraulic actuator (ram), the current shaft RPM, and the position in the oscillation cycle, and other system conditions. The result of this second embodiment is again to achieve the waveforms of FIG. 11.

Controlling a variable speed drive, or motor drive, may comprise the step (typically carried out by a system controller) of regulating the variable speed motor (e.g. by providing it with a calculated torque or speed demand) taking into account the state of charge of the hydraulic actuator, the current speed of rotation of the rotatable body, and the current position in the oscillation cycle (of alternating pumping and motoring), and optionally other system conditions, in order to provide a controllable oscillation of the object.

Controlling the hydraulic pump-motor, may comprise the step (typically carried out by a system controller) of automatically regulating (e.g. adjusting) the frequency of alternative pumping and motoring. Typically, this maximises the frequency with which the object is driven thus allowing a maximum achievable workrate. The term workrate recognises that not all energy input to the system provides useful work, that we wish to maximise the fraction of energy input that performs useful work, and that the rate of such work is a useful target and measure of performance.

Figure 15:
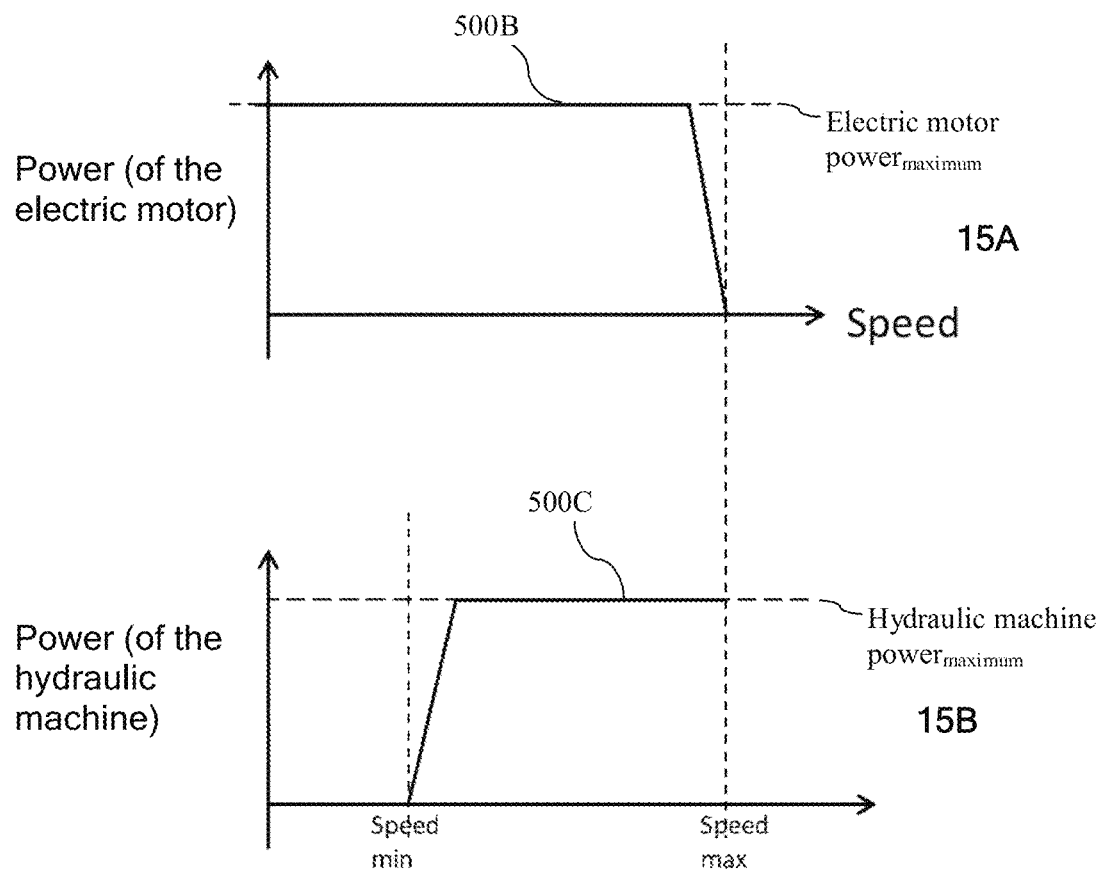
FIG. 15 illustrates the variation in electric motor power with speed of rotation of the rotatable body; in the upper figure the horizontal-axis shows electric motor power in the sense which accelerates the rotation and in the lower figure the vertical-axis shows hydraulic machine power, while pumping, in the sense which decelerates the rotation.

The electric motor is typically controlled to input power continuously. FIG. 15A is a graph showing power provided by the electric motor to accelerate the rotation of the rotatable body. The power output 500B of the electric motor is typically kept at a maximum unless the rotatable body is close to its maximum speed of rotation in which case the power output is controlled and limited to avoid overspeed.

During motoring of the hydraulic pump-motor (FIG. 15B is a graph showing the relationship between power provided by the hydraulic machine to accelerate or decelerate the speed of rotation), the power output 500C of the hydraulic pump-motor is typically kept at a maximum. As the speed of rotation approaches a minimum threshold, thus the displacement of the hydraulic pump-motor operating as a motor is ramped down, such that no negative torque is applied by the hydraulic machine at or below the minimum threshold speed.

During operation, a demand fraction $F_d$ (fraction of maximum displacement per rotation of the rotatable body) is controlled as required to meet the time varying demand and is also regulated to avoid underspeed of the rotatable body.

Figure 16:
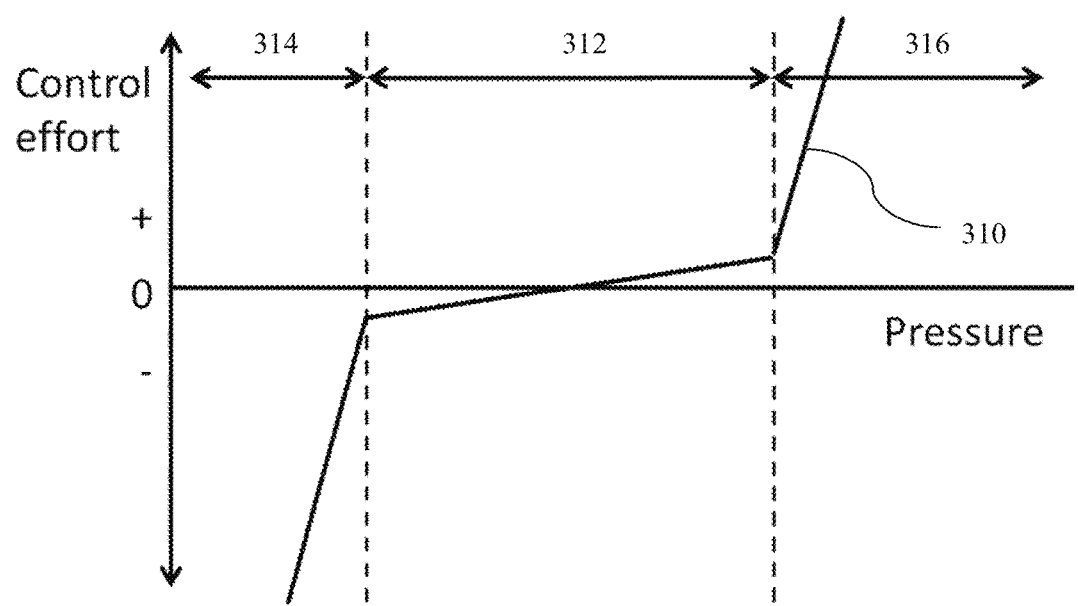
FIG. 16 illustrates the variation in electric motor torque with peak speed of rotation.

FIG. 16 illustrates the control of the electric motor power (vertical-axis) during operation in dependence on the peak pressure 310 of the high pressure fluid line 122 on successive cycles. The further the vertical-axis power value is from zero, the greater the increase in electric motor power output from one cycle to the next. If the peak pressure is within a central range or region 312 it is regulated relatively weakly and with low gain but if the peak pressure exceeds or falls below thresholds (regions 314, 316) it is regulated more strongly and with higher gain.

In some embodiments, there is a feedback loop in the variable speed drive, which is configured such that an uncommanded drop in the speed of the electric motor (e.g. due to the application of a mechanical load) leads to a controlled increase in the supplied current. Correspondingly the feedback loop will decrease the active current supply in order to decrease speed. In respect of FIG. 16, this regulation action over the electric motor is carried out at all pressures, however within the central region 312 the gain is low (the regulation is relatively weak). When pressure is out of this region, either above in region 316 or below in region 314, then the gain is higher (the regulation is relatively strong).

The invention claimed is:

1. An apparatus for repetitively displacing an object, the apparatus comprising:
    an object engagement element,
    a hydraulic actuator connected to the object engagement element,
    a hydraulic machine having a low pressure manifold and a high pressure manifold, the high pressure manifold coupled to the hydraulic actuator, a rotatable body comprising a rotatable shaft, a plurality of working chambers having a volume which varies cyclically with rotation of the rotatable shaft, a plurality of valves regulating the flow of working fluid between the respective working chambers and the low and high pressure manifold, at least one valve per working chamber being an electronically controlled valve,
    a controller which is configured to electronically control the valves to thereby regulate the net displacement of working fluid by each working chamber during each cycle of working chamber volume, including selecting between pumping cycles in which a working chamber makes a net displacement of working fluid from the low pressure manifold to the high pressure manifold, and motoring cycles in which a working chamber makes a net displacement of working fluid from the high pressure manifold to the low pressure manifold, and
    a motor drivingly coupled to the rotatable body and configured to exert a torque on the rotatable body,
    wherein the controller is configured to alternately control the valves to thereby regulate the pumping of working fluid to the hydraulic actuator to thereby displace an object which engages the object engagement element in use and then to control the valves to thereby regulate the motoring of working fluid from the hydraulic actuator as a result of forces from the object bearing on the object engagement element,
    the speed of rotation of the rotatable body varies and the control of the valves by the controller takes into account the speed of rotation of the rotatable body.

2. The apparatus according to claim 1, wherein the motor is an electrical motor having an electronic variable speed drive which allows at least a 10% change in the speed of rotation of the rotatable body during operation.

3. A system for repetitively displacing an object comprising a plurality of apparatuses according to claim 1, with the object engaging elements of the respective apparatus being attachable to or attached to different parts of an object and a system controller operable to regulate in concert the pumping and motoring of the respective apparatus to control the movement of the object engaging elements in concert.

4. The apparatus according to claim 1, wherein rotational kinetic energy of the rotatable body is used at least in part to drive the pumping of working fluid to the hydraulic actuator and the speed of rotation of the rotatable body falls as a result, and wherein the subsequent output of working fluid from the hydraulic actuator is used to motor the hydraulic machine to accelerate the rotation of the rotatable body.

5. The apparatus according to claim 1, wherein the pumping of working fluid to the hydraulic actuator and the motoring of working fluid from the hydraulic actuator are configured to take place cyclically, and wherein the rotatable body is configured to rotate in a single direction, with increasing and decreasing speed of rotation, and wherein the action of the motor on the rotatable body acts to maintain the peak rotational kinetic energy of the rotatable body from one cycle to the next by providing sufficient energy during each cycle to compensate for losses.

6. The apparatus according to claim 1, wherein the valves are configured to be controlled to regulate the pumping and/or the motoring such that one or more of the group consisting of:
   (i) the displacement of the object engagement element along a path;
   (ii) the force exerted by the object engagement element on an object; and
   (iii) the pressure in the high pressure manifold;
   is regulated to follow a time-varying demand, which may be predetermined.

7. A method of repetitively displacing an object, the method comprising providing a hydraulic apparatus, the hydraulic apparatus comprising:
   a hydraulic actuator coupled to the object through an object engagement element,
   a hydraulic machine having a low pressure manifold and a high pressure manifold, the high pressure manifold coupled to the hydraulic actuator, a rotatable body comprising a rotatable shaft,
   a plurality of working chambers having a volume which varies cyclically with rotation of the rotatable shaft, a plurality of valves regulating the flow of working fluid between the respective working chambers and the low and high pressure manifold, at least one valve per working chamber being an electronically controlled valve, and
   a motor drivingly coupled to the rotatable body,
   the method comprising:
   operating the motor to exert a torque on the rotatable body to thereby increase the rotational kinetic energy of the rotatable body, the speed of rotation of the rotatable body varying during operation, and
   controlling the valves to thereby regulate the net displacement of working fluid by each working chamber during each cycle of working chamber volume, such that the working chambers alternately carry out pumping and motoring, wherein during pumping the valves are controlled to cause the working chambers to carry out pumping cycles in which a working chamber makes a net displacement of working fluid from the low pressure manifold to the high pressure manifold,
   wherein during motoring the valves are controlled to cause the working chambers to carry out motoring cycles in which a working chamber makes a net displacement of working fluid from the high pressure manifold to the low pressure manifold, the working fluid received from the hydraulic actuator as a result of force from the object bearing on the object engagement element, and
   wherein the control of the valves takes into account the varying speed of rotation of the rotatable body.

8. The method according to claim 7, the method comprising providing a plurality of said hydraulic apparatus coupled to different parts of the object, and controlling the pumping and motoring by the respective hydraulic apparatus in concert to thereby cause the object to be displaced according to a time-varying profile.

9. The method according to claim 7, wherein rotational kinetic energy of the rotatable body is used at least in part to drive the pumping of working fluid to the hydraulic actuator and the speed of rotation of the rotatable body falls as a result, and wherein the subsequent output of working fluid from the hydraulic actuator is used to motor the hydraulic machine to accelerate the rotation of the rotatable body.

10. The method according to claim 7, wherein the pumping of working fluid to the hydraulic actuator and the motoring of working fluid from the hydraulic actuator takes place cyclically.

11. The method according to claim 7, wherein the rotatable body rotates in a single direction, with increasing and decreasing speed of rotation, and wherein the action of the motor on the rotatable body acts to maintain the peak rotational kinetic energy of the rotatable body from one cycle to the next by providing sufficient energy during each cycle to compensate for losses.

12. The method according to claim 11, wherein a target rotation speed of the rotatable body is determined, the electric motor is regulated towards the target rotation speed, the electric motor is a variable speed motor driven by a variable speed drive configured to allow the speed to vary within a range, the hydraulic machine alternately decelerating the rotatable body during said pumping cycles and accelerating the rotatable body during said motoring cycles, thus leading to an oscillation in speed of rotation of the rotatable body between said pumping and said motoring, wherein a torque trim is applied by the variable speed drive driving the motor in order to make up for losses in the apparatus and provide a controlled oscillation of the object, optionally wherein the hydraulic machine is controlled to avoid overspeed or underspeed of the rotation of the rotatable body.

13. The method according to claim 12, comprising determining a time-varying demand through a cycle of displacement by one or more of:
   (i) simulating and/or monitoring the force exerted by the object on the object engagement element during a cycle of displacement,
   (ii) simulating and/or monitoring the movement of the object during a cycle of displacement,
   (iii) simulating and/or monitoring the loss of energy during a cycle of displacement, and/or
   (iv) detecting the violation of thresholds as to displacement, speed of movement or force exerted during a cycle of displacement.

14. A method of controlling a variable speed drive, according to claim 11, wherein the motor is a variable speed motor having a variable speed drive, wherein the variable speed drive regulates the motor responsive to a torque or speed demand signal calculated taking into account the state of charge of the hydraulic actuator, the current speed of rotation of the rotatable body, and the current position in an oscillation cycle, and optionally other system conditions, in order to provide a controllable oscillation of the object.

15. A method of controlling the hydraulic pump-motor, according to claim 11, wherein the frequency of alternate pumping and motoring is automatically regulated to maximise the frequency with which the object is driven thus allowing a maximum achievable workrate.

16. The method according to claim 7, wherein the valves are controlled to regulate the pumping and/or the motoring such that one or more of the group consisting of:
(i) the displacement of the object engagement element along a path;
(ii) the force exerted by the object engagement element on an object; and
(iii) the pressure in the high pressure manifold;
is regulated to follow a time-varying demand, which may be predetermined.

17. The method according to claim 7, wherein the valves are controlled to regulate a net rate of displacement of working fluid per unit time of the plurality of working chambers, said net rate of displacement per unit time being selectable independently of the speed of rotation of the rotatable body.

18. The method according to claim 7, wherein the speed of rotation of the rotatable body varies by more than 10%.

19. The method according to claim 7, wherein the power transmitted to the rotatable body temporarily exceeds the maximum and/or rated output torque of the motor, optionally wherein the motor is driven at above its maximum continuous rated torque for a limited period of time.

20. The method according to claim 7, wherein the relationship between the displacement of working fluid to or from the high pressure manifold and the pressure in the high pressure manifold is monitored to determine whether one or more fault criteria are met.

* * * * *